US012585366B2

(12) United States Patent
Han et al.

(10) Patent No.: US 12,585,366 B2
(45) Date of Patent: Mar. 24, 2026

(54) DISPLAY DEVICE

(71) Applicant: Samsung Display Co., Ltd., Yongin-si (KR)

(72) Inventors: Hyeyun Han, Yongin-si (KR); Giryung Lee, Yongin-si (KR); Yong-Hwan Park, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 45 days.

(21) Appl. No.: 18/669,434

(22) Filed: May 20, 2024

(65) Prior Publication Data

US 2025/0028413 A1     Jan. 23, 2025

(30) Foreign Application Priority Data

Jul. 20, 2023    (KR) ........................ 10-2023-0094574
Nov. 7, 2023    (KR) ........................ 10-2023-0152606

(51) Int. Cl.
G06F 3/044          (2006.01)

(52) U.S. Cl.
CPC .......... G06F 3/0443 (2019.05); G06F 3/0446 (2019.05); *G06F 2203/04107* (2013.01)

(58) Field of Classification Search
None
See application file for complete search history.

(56) References Cited

U.S. PATENT DOCUMENTS 11,237,659 B2     2/2022  Kim et al.
11,523,522 B2    12/2022  Lee et al.

11,600,675 B2     3/2023  Kim et al.
11,703,982 B2 *   7/2023  Lee ........................ G06F 3/0412
                                                     345/173
11,789,578 B2 *  10/2023  Song ..................... G06F 3/0443
                                                     345/174
2018/0164931 A1    6/2018  Na et al.
2020/0081580 A1 *  3/2020  Kim ..................... G06F 3/0446
2020/0295092 A1    9/2020  Moon et al.
2020/0357857 A1   11/2020  Park et al.
(Continued)

FOREIGN PATENT DOCUMENTS

CN          86201072 U  *  11/1986
CN        107342370 A  *  11/2017  .......... G06F 3/0412
(Continued)

*Primary Examiner* — Duane N Taylor, Jr.

(74) *Attorney, Agent, or Firm* — Womble Bond Dickinson (US) LLP

(57)                ABSTRACT

Provided is a display device including a display panel including emission areas, and an input sensor above the display panel, and including conductive patterns, wherein the display panel includes a light-emitting element overlapping at least one of the emission areas, and including an anode, an emission layer above the anode, and a cathode above the emission layer, and an auxiliary electrode spaced apart from the anode in plan view, and electrically connected to the cathode at a connection area, wherein the conductive patterns include mesh patterns defining openings respectively overlapping the emission areas, the mesh patterns including a first mesh pattern having a first width, and a second mesh pattern including a portion having a second width that is greater than the first width, and including a portion entirely covering the connection area.

20 Claims, 15 Drawing Sheets

(56) References Cited

U.S. PATENT DOCUMENTS

| | | | |
|---|---|---|---|
| 2022/0067340 A1* | 3/2022 | Han | G06F 3/042 |
| 2022/0261115 A1 | 8/2022 | Bok et al. | |
| 2023/0105728 A1 | 4/2023 | Park et al. | |
| 2023/0205375 A1* | 6/2023 | Cha | G06F 3/0445 |
| | | | 345/173 |
| 2023/0221824 A1 | 7/2023 | Bok et al. | |

FOREIGN PATENT DOCUMENTS

| | | |
|---|---|---|
| KR | 10-2147842 B1 | 8/2020 |
| KR | 10-2021-0053381 A | 5/2021 |
| KR | 10-2021-0054390 A | 5/2021 |
| KR | 10-2023-0108771 A | 7/2023 |

* cited by examiner

FIG. 4C

DISPLAY DEVICE

CROSS-REFERENCE TO RELATED APPLICATIONS

The present application claims priority to, and the benefit of, Korean Patent Application Nos. 10-2023-0094574, filed on Jul. 20, 2023, and 10-2023-0152606, filed on Nov. 7, 2023, in the Korean Intellectual Property Office, the entire disclosures of which are incorporated herein by reference.

BACKGROUND

1. Field

The present disclosure herein relates to a display device having improved visibility.

2. Description of the Related Art

Multimedia devices, such as televisions, mobile phones, tablets, navigation devices, game consoles, etc., include display devices, each of which displays images to a user through a display screen. Such a display device may include a display panel that generates an image, and an input sensor that detects a user's touch.

The input sensor may include a conductor that detects an external input, and the conductor of the input sensor located on the display panel may affect emission efficiency of the display device or external light reflectance of the display device.

SUMMARY

The present disclosure provides a display device having improved visibility.

One or more embodiments of the present disclosure provide a display device including a display panel including emission areas, and an input sensor above the display panel, and including conductive patterns, wherein the display panel includes a light-emitting element overlapping at least one of the emission areas, and including an anode, an emission layer above the anode, and a cathode above the emission layer, and an auxiliary electrode spaced apart from the anode in plan view, and electrically connected to the cathode at a connection area, wherein the conductive patterns include mesh patterns defining openings respectively overlapping the emission areas, the mesh patterns including a first mesh pattern having a first width, and a second mesh pattern including a portion having a second width that is greater than the first width, and including a portion entirely covering the connection area.

The first mesh pattern may include a first mesh line extending in a first direction, wherein the second mesh pattern includes a second mesh line extending in the first direction.

Each of the mesh patterns may further include a third mesh line extending in a second direction crossing the first direction, and having a third width that is less than the second width.

The emission areas may include first emission areas configured to emit first color light, second emission areas configured to emit second color light different from the first color light, and alternately arranged with the first emission areas along the second direction, and third emission areas configured to emit third color light different from the first color light and the second color light, and spaced apart from the first emission areas and the second emission areas in the first direction.

The connection area may overlap at least a portion of the third emission areas in the second direction.

The first mesh pattern may be between one of the first emission areas and one of the second emission areas adjacent thereto, wherein adjacent pairs of the third emission areas define emission area pairs spaced from each other by a first distance in the second direction, and wherein two adjacent ones of the emission area pairs are spaced from each other a second distance in the second direction that is greater than the first distance with the second mesh pattern therebetween.

The second mesh pattern may include a 2-1 mesh line between the two adjacent emission area pairs, overlapping the connection area, and having a 2-1 width, and a 2-2 mesh line between two other adjacent emission area pairs, not overlapping the connection area, and having a 2-2 width that is less than the 2-1 width.

The second mesh pattern may include a 2-1 mesh line between the two adjacent emission area pairs, overlapping the connection area, and having a 2-1 width, and a 2-2 mesh line between two other adjacent emission area pairs, not overlapping the connection area, and having a 2-2 width that is substantially equal to the 2-1 width.

The input sensor may include a first sensor-insulating layer above the display panel, and a second sensor-insulating layer above the first sensor-insulating layer.

The second mesh pattern may be above the second sensor-insulating layer. The second mesh pattern may be above the first sensor-insulating layer.

The second mesh pattern may include a first layer pattern above the first sensor-insulating layer, and a second layer pattern above the second sensor-insulating layer.

The first layer pattern may have the second width, wherein the second layer pattern has a width that is less than the second width.

The display panel may further include a pixel-defining layer defining pixel openings respectively defining the emission areas, and a connection opening defining the connection area, wherein at least a portion of the emission layer is inside one of the pixel openings, and wherein the cathode is inside the connection opening to contact the auxiliary electrode.

The emission layer might not overlap the connection area.

The connection area has a width of about 1 micrometers or more and about 100 micrometers or less.

In one or more embodiments of the present disclosure, a display device includes a display panel including emission areas, and an input sensor above the display panel, and including conductive patterns, wherein the display panel includes a light-emitting element overlapping at least one of the emission areas, and including an anode, an emission layer above the anode, and a cathode above the emission layer, and an auxiliary electrode spaced apart from the anode in plan view, and electrically connected to the cathode at a connection area, wherein the conductive patterns include a first sensing electrode including first sensing patterns arranged in a first direction, and bridge patterns configured to connect adjacent ones of the first sensing patterns, and a second sensing electrode spaced apart from the first sensing electrode, and including second sensing patterns extending in a second direction crossing the first direction, wherein each of the first sensing electrode and the second sensing electrode includes mesh patterns defining openings respectively overlapping the emission areas, and including a portion entirely covering the connection area.

The input sensor may further include a first sensor-insulating layer above the display panel, and a second sensor-insulating layer above the first sensor-insulating layer, wherein the first sensing patterns and the second sensing patterns are above the second sensor-insulating layer.

The connection area may have a reference width in the second direction, wherein a portion of the mesh patterns has a second width that is greater than the reference width.

In one or more embodiments of the present disclosure, a display device includes a display panel including first emission areas configured to emit first color light, second emission areas configured to emit second color light that is different from the first color light, and third emission areas configured to emit third color light that is different from the first color light and the second color light, and an input sensor above the display panel, and including conductive patterns, wherein the display panel includes a light-emitting element including an anode, an emission layer above the anode, and a cathode above the emission layer, and an auxiliary electrode spaced apart from the anode in plan view, above a portion of the third emission areas, and electrically connected to the cathode at a connection area, wherein the conductive patterns include mesh patterns defining openings respectively overlapping the first, second, and third emission areas are defined, and including a portion entirely covering the connection area.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain aspects of the present disclosure. In the drawings:

FIG. 4A to 4C are plan views illustrating a display area according to one or more embodiments of the present disclosure;

DETAILED DESCRIPTION

Figure 1:
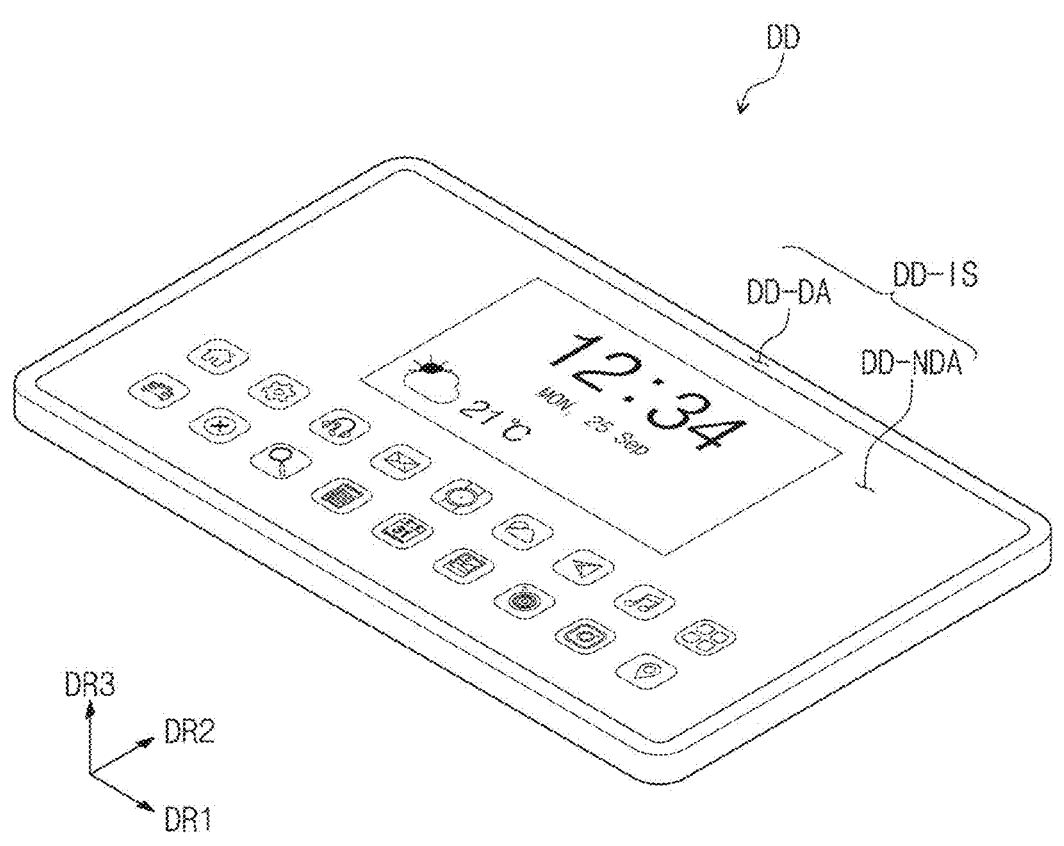
FIG. 1 is a perspective view of a display device according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing one or more embodiments corresponds to one or more embodiments of the present disclosure. The present disclosure covers all modifications, equivalents, and replacements within the idea and technical scope of the present disclosure. Further, each of the features of the various embodiments of the present disclosure may be combined with each other, in part or in whole, and technically various interlocking and driving are possible. Each embodiment may be implemented independently of each other or may be implemented together in an association.

In the drawings, the relative sizes of elements, layers, and regions may be exaggerated for clarity and/or descriptive purposes. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "upper side," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a resistor, a capacitor, and/or the like. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are used only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view of a display device DD according to one or more embodiments of the present disclosure. As illustrated in FIG. 1, the display device DD may display an image through a display surface DD-IS. The display surface DD-IS may have a rectangular shape having long sides extending in a first direction DR1, and short sides extending in a second direction DR2 crossing the first direction DR1 on a plane. However, the present disclosure is not limited thereto. For example, the display module DM may have various shapes, such as a circular shape, a polygonal shape, or the like.

The third direction DR3 may be defined as a direction that is substantially perpendicular to a plane defined by the first direction DR1 and the second direction DR2. A front surface (or top surface) and a rear surface (or bottom surface) of each of members constituting the display device DD may be opposed to each other in the third direction DR3, and a normal direction of each of the front and rear surfaces may be substantially parallel to the third direction DR3. A spaced distance between the front surface and the rear surface defined along the third direction DR3 may correspond to a thickness of a member.

In this specification, the term "on the plane" may be defined as a state when viewed in the third direction DR3. That is, "on the plane" may be explained based on the plane defined together by the first direction DR1 and the second direction DR2. In this specification, "on the cross-section" may be defined as a state when viewed from the first direction DR1 or the second direction DR2. The directions indicated as the first to third directions DR1, DR2, and DR3 may be a relative concept, and thus may be changed into different directions.

Although the display device DD having a planar display surface is illustrated, the present disclosure is not limited thereto. The display device DD may include a curved display surface or a solid display surface. The solid display surface may include a plurality of display areas that indicate different directions. For example, the solid display surface may include a bent display surface. The display device DD may be a flexible display device DD. The flexible display device DD may be a foldable display device that is capable of being folded.

The display device DD that is capable of being applied to a tablet terminal is illustrated. An electronic module, a camera module, a power module, and the like, which are mounted on a main board, may be located on a bracket/case together with the display device DD to constitute the tablet terminal. The display device DD according to one or more embodiments of the present disclosure may be applied to large-sized electronic apparatuses, such as televisions and monitors, and to small and middle-sized electronic apparatuses, such as mobile phones, navigation units for vehicles, game consoles, and smart watches.

As illustrated in FIG. 1, the display surface DD-IS includes an image area DD-DA on which an image is displayed, and a bezel area DD-NDA adjacent to the image area DD-DA. The bezel area DD-NDA may be an area on which an image is not displayed. FIG. 1 illustrates icon images as examples of the image.

As illustrated in FIG. 1, the image area DD-DA may have a substantially rectangular shape. The "substantially rectangular shape" includes not only a rectangular shape in a geometrical sense, but also a rectangular shape in which a vertex is not defined in a vertex area (or a corner area), and instead a boundary of a curve is defined.

The bezel area DD-NDA may surround the image area DD-DA. However, the shape is not limited thereto, and the shape of the bezel area DD-NDA may be modified. For example, the bezel area DD-NDA may be located at only one side of the image area DD-DA.

Figure 2:
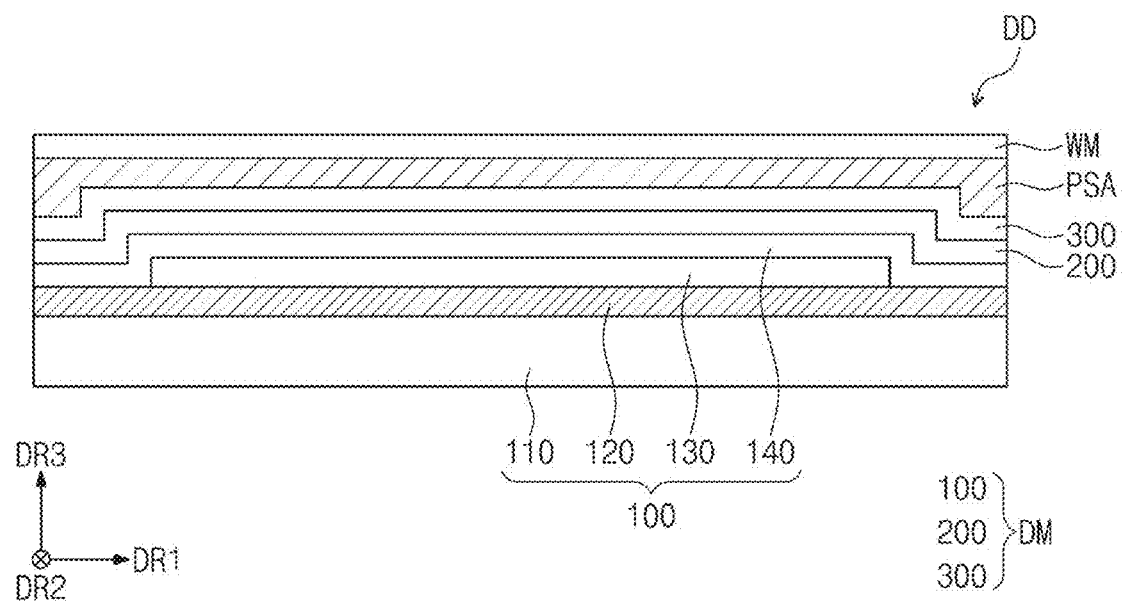
FIG. 2 is a cross-sectional view of the display device according to one or more embodiments of the present disclosure.

FIG. 2 is a cross-sectional view of the display device DD according to one or more embodiments of the present disclosure.

The display device DD may include a display module DM, and a window WM located on the display module DM. The display module DM and the window WM may be coupled to each other by an adhesive layer PSA. According to one or more embodiments of the present disclosure, the window WM may be formed by a coating method, and the window WM may contact the display module DM. In this case, the adhesive layer PSA may be omitted.

The display module DM may include a display panel 100, an input sensor 200, and an anti-reflective layer 300. The display panel 100 may include a base layer 110, a driving element layer 120, a light-emitting element layer 130, and an encapsulation layer 140.

The driving element layer 120 is located on a top surface of the base layer 110. The base layer 110 may be a flexible substrate capable of being bent, folded, or rolled. The base layer 110 may be a glass substrate, a metal substrate, or a polymer substrate. However, the present disclosure is not limited thereto. For example, the base layer 110 may be an inorganic layer, an organic layer, or a composite layer. The base layer 110 has substantially the same shape as the display panel 100.

The base layer 110 may have a multilayered structure. For example, the base layer 110 may include a first synthetic resin layer, a second synthetic resin layer, and inorganic layers located between the first and second synthetic resin layers. Each of the first and second synthetic resin layers may include a polyimide-based resin, but the present disclosure is not limited thereto.

The driving element layer 120 may be located on (as used herein, "on" may mean "above") the base layer 110. The driving element layer 120 may include a plurality of insulating layers, a plurality of semiconductor patterns, a plurality of conductive patterns, and signal lines. The driving element layer 120 may include a driving circuit of a pixel.

The light-emitting element layer 130 may be located on the driving element layer 120. The light-emitting element layer 130 may include a light-emitting element. For example, the light-emitting element may include an organic light-emitting material, an inorganic light-emitting material, an organic-inorganic light-emitting material, a quantum dot, a quantum rod, a micro LED, or a nano LED.

An encapsulation layer 140 may be located on/above the light-emitting element layer 130. The encapsulation layer 140 may protect the light-emitting element layer 130 (e.g., a light-emitting element) against foreign substances, such as moisture, oxygen, and dust particles. The encapsulation layer 140 may include at least one inorganic encapsulation layer. The encapsulation layer 140 may include a laminated structure of a first inorganic encapsulation layer/an organic encapsulation layer/a second inorganic encapsulation layer.

The input sensor 200 may be directly located on the display panel 100. The input sensor 200 may detect a user's input using, for example, an electromagnetic induction method and/or a capacitance method. The display panel 100 and the input sensor 200 may be formed through continuous processes. Here, "directly located" may mean that a third component is not located between the input sensor 200 and the display panel 100. For example, a separate adhesive layer might not be located between the input sensor 200 and the display panel 100.

The anti-reflective layer 300 reduces reflectance of external light incident from an upper side of the window WM. The anti-reflective layer 300 according to one or more embodiments of the present disclosure may include a retarder and a polarizer. The retarder may be a film type or liquid-crystal-coating-type retarder and may include a λ/2 retarder and/or a λ/4 retarder. The polarizer may also be provided in a film type or liquid-crystal-coating-type polarizer. The film type may include an elongation-type synthetic resin, and the liquid-crystal-coating type may include liquid crystals that are arranged (e.g., arranged in a predetermined arrangement). Each of the retarder and the polarizer may further include a protection film. The retarder and polarizer itself, or the protection film, may be defined as a base layer of the anti-reflective layer 300.

The anti-reflective layer 300 according to one or more embodiments of the present disclosure may include color filters. The color filters may have an arrangement (e.g., a predetermined arrangement). The color filters may be determined in arrangement in consideration of colors of light emitted from pixels provided in the display panel 100. The anti-reflective layer 300 may further include a black matrix adjacent to the color filters. The anti-reflective layer 300 including the color filters may be located directly on the display panel 100.

The window WM according to one or more embodiments of the present disclosure may include a base layer and a light-blocking pattern. The base layer may include a glass substrate and/or a synthetic resin film. The light-blocking pattern partially overlaps the base layer WP-BS. The light-blocking pattern may be located on a rear surface of the base layer, and the light-blocking pattern may substantially define the bezel area DD-NDA (see FIG. 1) of the display device DD. An area on which the light-blocking pattern is not located may define the image area DD-DA (see FIG. 1) of the display device DD.

Figure 3:
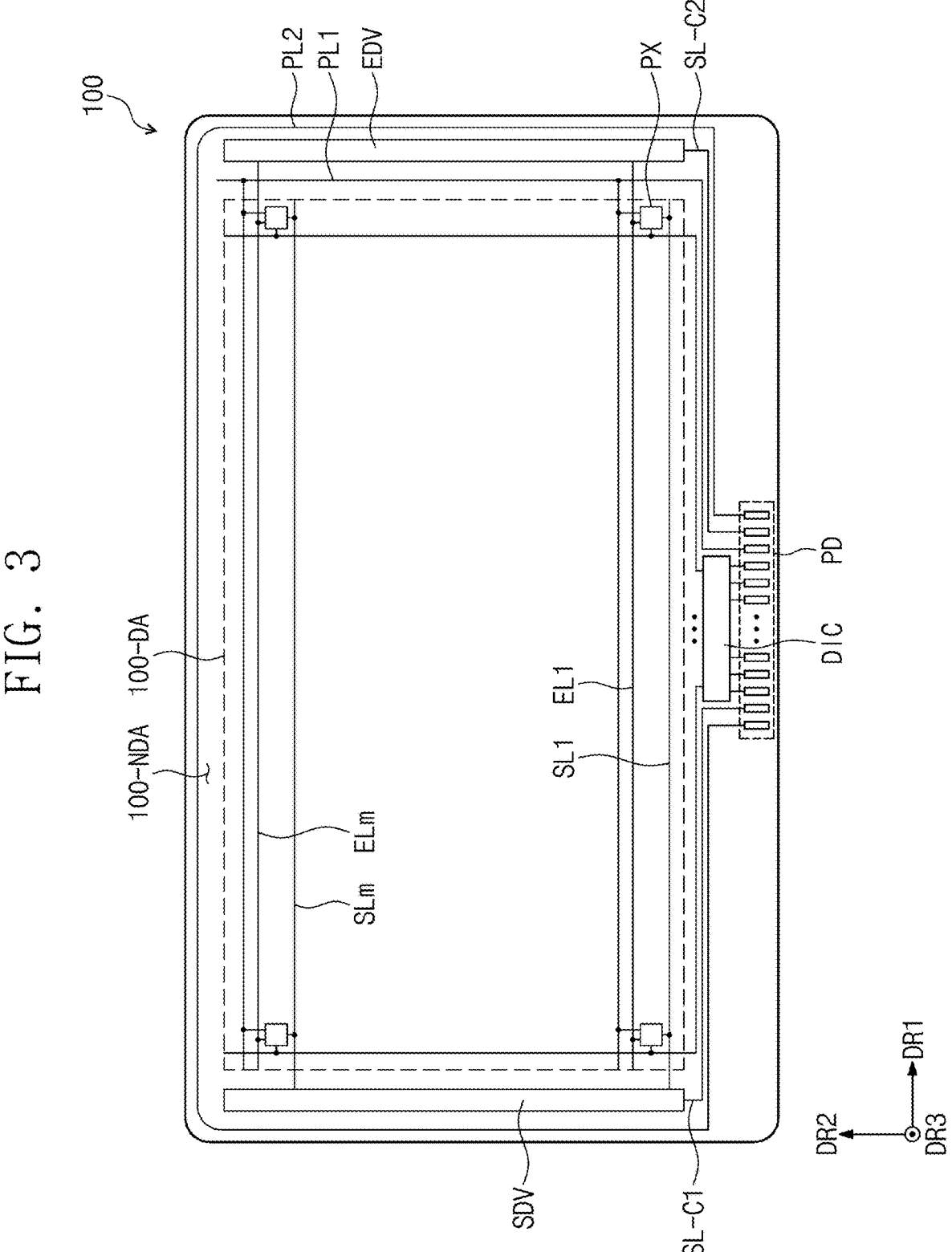
FIG. 3 is a plan view of a display panel according to one or more embodiments of the present disclosure.

FIG. 3 is a plan view of the display panel 100 according to one or more embodiments of the present disclosure.

Referring to FIG. 3, the display panel 100 may include a plurality of pixels PX, a scan-driving circuit SDV, an emission-driving circuit EDV, a plurality of signal lines, and a plurality of pads PD. The plurality of pixels PX are located on a display area 100-DA. A driving chip DIC mounted on a non-display area 100-NDA may include a data-driving circuit. The display area 100-DA may correspond to the image area DD-DA of FIG. 1, and the non-display area 100-NDA may correspond to the bezel area DD-NDA. In this specification, "an area or portion corresponds to an area or portion" may mean the areas or portions overlap each other, and is not necessarily limited to two different areas or portions having the same surface area. In one or more embodiments of the present disclosure, the data-driving circuit may also be integrated with the display panel 100 like the scan-driving circuit SDV and the emission-driving circuit EDV.

The plurality of signal lines may include a plurality of scan lines SL1 to SLm, a plurality of data lines DL1 to DLn, a plurality of emission lines EL1 to ELm, and first and second control lines SL-C1 and SL-C2, and first and second power lines PL1 and PL2. Here, m and n are natural numbers greater than or equal to 2.

The scan lines SL1 to SLm may extend in the first direction DR1, and may be electrically connected to the pixels PX and the scan-driving circuit SDV. The data lines DL1 to DLn may extend in the second direction DR2, and may be electrically connected to the pixels PX and the driving chip DIC. The emission lines EL1 to ELm may extend in the first direction DR1, and may be electrically connected to the pixels PX and the emission-driving circuit EDV.

The first power line PL1 may receive a first power voltage, and the second power line PL2 may receive a second power voltage that is at a lower level than the first power voltage. In one or more embodiments, the second electrode (e.g., cathode) of the light-emitting element is connected to the second power line PL2.

The first control line SL-C1 may be connected to the scan-driving circuit SDV, and may extend toward a lower end of the display panel 100. The second control line SL-C2 may be connected to the emission-driving circuit EDV, and may extend toward the lower end of the display panel 100. The pads PD may be located on the non-display area 100-NDA adjacent to the lower end of the display panel 100, and may be closer to the lower end of the display panel 100 than the driving chip DIC. The pads PD may be connected to the driving chip DIC and some signal lines.

The scan-driving circuit SDV may generate a plurality of scan signals, and the scan signals may be applied to the pixels PX through the scan lines SL1 to SLm. The driving chip DIC may generate a plurality of data voltages, and the data voltages may be applied to the pixels PX through the data lines DL1 to DLn. The emission-driving circuit EDV may generate a plurality of emission signals, and the emission signals may be applied to the pixels PX through the emission lines EL1 to ELm. The pixels PX may receive the data voltages in response to the scan signals. The pixels PX may emit light having luminance corresponding the data voltages in response to the emission signals to display an image.

Figure 4A:
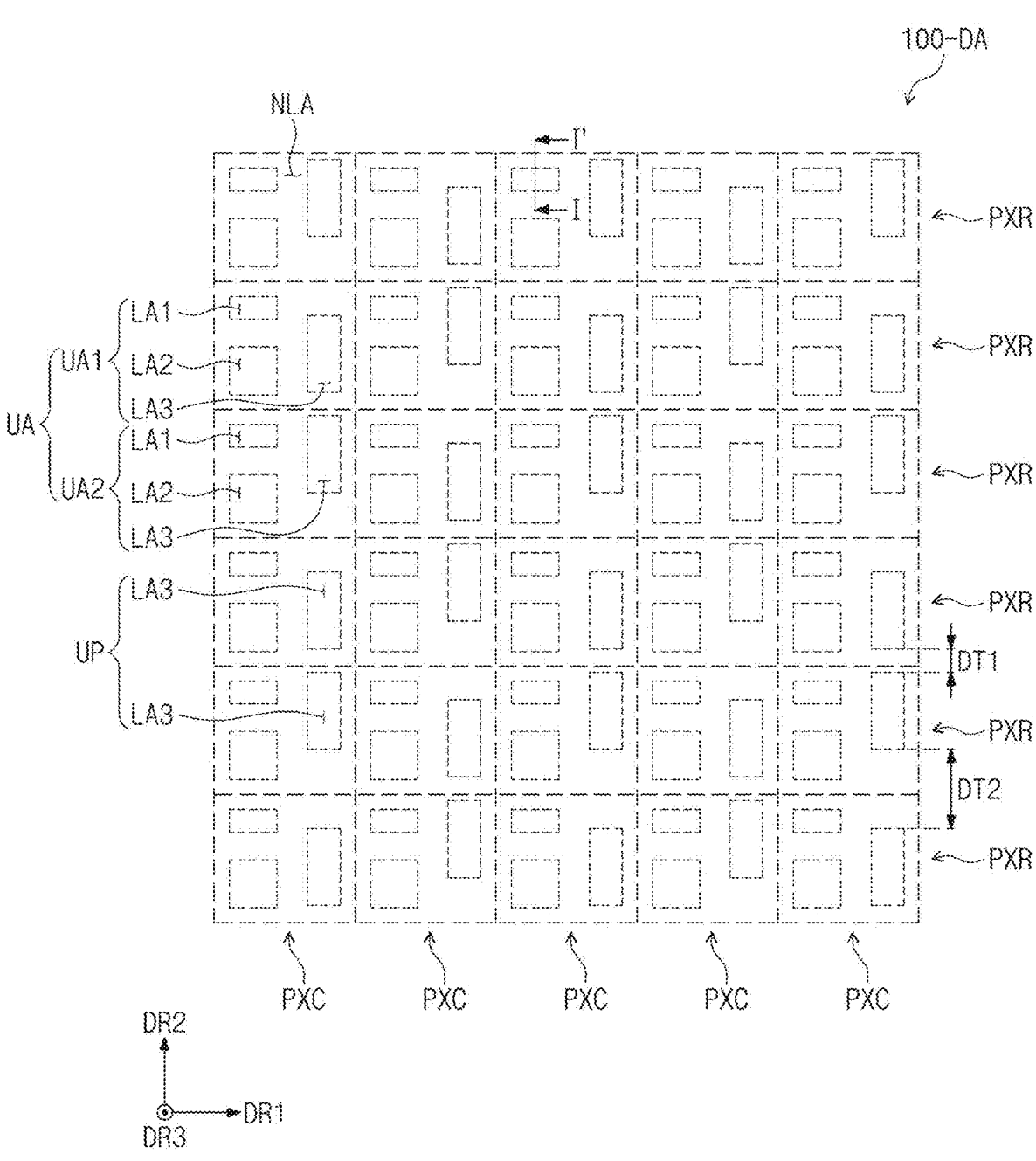
Figure 4B:
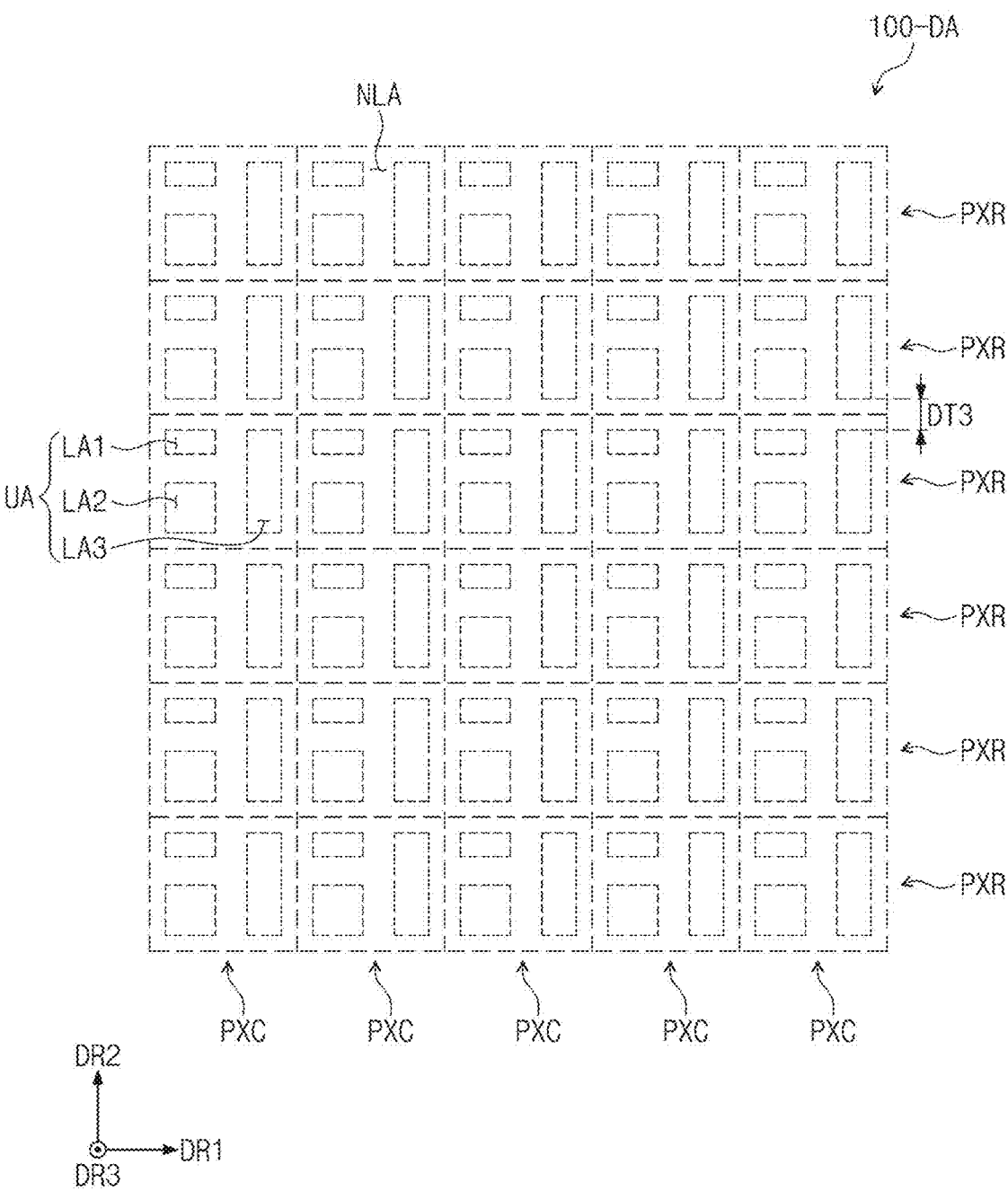
Figure 4C:
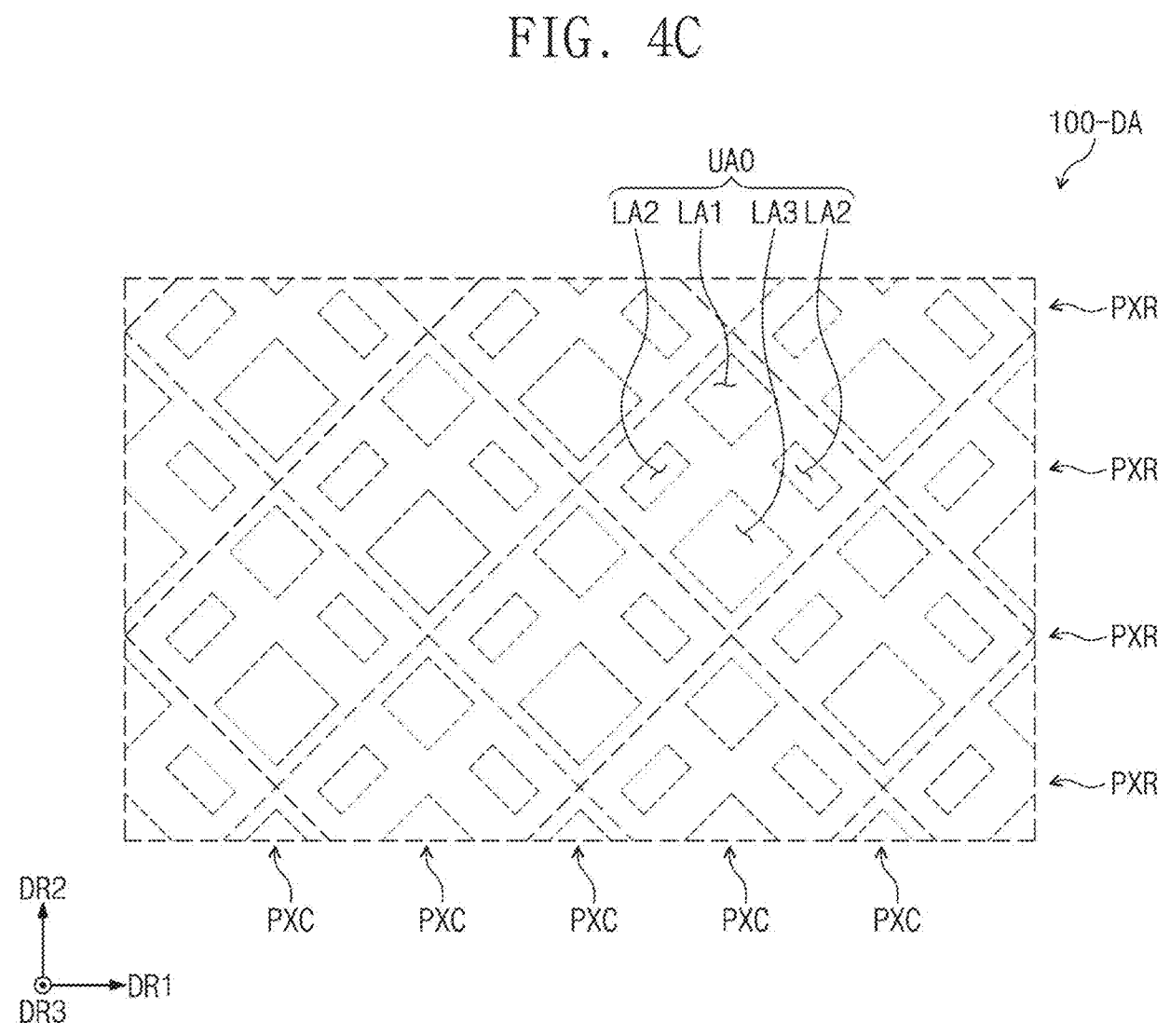

FIGS. 4A to 4C are plan views of the display area 100-DA according to one or more embodiments of the present disclosure.

Referring to FIG. 4A, the display area 100-DA may include a plurality of emission areas LA1, LA2, and LA3, and a non-emission area NLA adjacent to the plurality of emission areas LA1, LA2, and LA3. The non-emission area NLA sets a boundary between the emission areas LA1, LA2, and LA3.

The emission areas LA1, LA2, and LA3 may be located to one-to-one correspond to the pixels PX in FIG. 3. Each of the pixels PX may include a light-emitting element, and the emission areas LA1, LA2, and LA3 may be areas on which light generated by the light-emitting element is emitted. An arrangement relationship between the emission areas LA1, LA2, and LA3 and the non-emission area NLA will be described later with reference to FIG. 5.

The emission areas LA1, LA2, and LA3 may include a first emission area LA1 (or first color emission area) having first color light, a second emission area LA2 (or second color light) having second color light, and a third emission area LA3 (or third color emission area) having third color light. The first color light may be red light, the second color light may be green light, and the third color light may be blue light.

The areas of the first emission area LA1, the second emission area LA2, and the third emission area LA3 may be different from each other, but are not necessarily limited thereto. The first emission area LA1 may have the smallest surface area, and the third emission area LA3 may have the largest surface area.

The first emission area LA1, the second emission area LA2, and the third emission area LA3 may define one unit emission area UA. The unit emission area UA may be a repetitive arrangement unit of the emission areas arranged on the display area 100-DA. The unit emission area UA may include a first unit emission area UA1 and a second unit emission area UA2.

Referring to the first unit emission area UA1 and the second unit emission area UA2, the first emission area LA1 and the second emission area LA2 are located at one side of the third emission area LA3 in the first direction DR1 (e.g., horizontal direction in FIG. 4A). The second emission area LA2 of each of the first unit emission area UA1 and the second unit emission area UA2 is located at one side (e.g., lower side in FIG. 4A) of the first emission area LA1 in the first direction DR1.

The arrangements of the first unit emission area UA1 and the second unit emission area UA2 are different with respect to the position of the corresponding third emission area LA3 with respect to the first emission area LA1 and the second emission area LA2 in the second direction DR2. Referring to the first unit emission area UA1, the position of the third emission area LA3 is located at a relatively lower side (e.g., with respect to the first emission area LA1 and the second emission area LA2 in the second direction DR2). Referring to the second unit emission area UA2, the position of the third emission area LA3 is located at a relatively upper side. The first unit emission area UA1 and the second unit emission area UA2 may be different in that the third emission area LA3 may be shifted by a different degree with respect to the first emission area LA1 and the second emission area LA2 in the second direction DR2. The third emission area LA3 of the second unit emission area UA2 may be relatively further shifted (e.g., closer to an edge of the second unit emission area UA2). However, it is not limited thereto, and the first unit emission area UA1 and the second unit emission area UA2 may have the third emission area LA3 shifted to the same degree with respect to the first emission area LA1 and the second emission area LA2 in the second direction DR2.

The first unit emission area UA1 and the second unit emission area UA2 may be alternately located along the first direction DR1 within a pixel row PXR. The first unit emission area UA1 and the second unit emission area UA2 may be alternately located along the second direction DR2 within a pixel column PXC. Due to the arrangement of the first unit emission area UA1 and the second unit emission area UA2, the third emission area LA3 of the first unit emission area UA1, and the third emission area LA3 of the second unit emission area UA2, may be arranged (e.g., may be arranged according to a predetermined rule). The third emission areas LA3 of adjacent first and second unit emission areas UA1 and UA2 are located relatively close to each other to be separated by a first distance DT1. The third emission area LA3 of the first unit emission area UA1 and the third emission area LA3 of the second unit emission area UA2, which are spaced the first distance DT1 from each other, may define an emission area pair UP. Adjacent emission area pairs UP may be spaced a second distance DT2 from each other within each pixel column PXC, wherein the second distance DT2 is greater than the first distance DT1.

The emission area pair UP may be formed due to a mask used during deposition. The light-emitting element located on the third emission area LA3 of the first unit emission area UA1, and the light-emitting element located on the third emission area LA3 of the second unit emission area UA2, may include emission layers having a shape to be integrated with each other. That is, the emission layer located on the third emission area LA3 of the first unit emission area UA1, and the emission layer located on the third emission area LA3 of the second unit emission area UA2, may be integral, and may be deposited using a single mask. Openings corresponding to the emission area pairs LP are defined in the corresponding mask. An area between the openings of the mask corresponds to a blocking area of the mask. The openings corresponding to the emission area pairs LP may be defined, and thus, the number of openings may be reduced, and a width of the blocking area of the mask located between the openings in the second direction DR2 may be secured. In the thin film mask, the width of the blocking area of the mask in the second direction DR2 may be secured to suppress defects, such as sagging of the mask during the deposition process.

This may be seen by comparing third distances DT3 between respective third emission areas LA3 illustrated in FIG. 4B. Referring to FIG. 4B, one type of unit emission area UA is located on the display area 100-DA. The third distance DT3 between the third emission areas LA3 of the adjacent unit emission areas UA of the pixel column PXC is less than the second distance DT2 in FIG. 4B. The mask used to form the third emission areas LA3 in FIG. 4B has a larger number of openings, and the width of the blocking area of the mask is relatively reduced. This is because the openings respectively corresponding to the third emission areas LA3 are defined in the mask that forms the emission layers in the third emission areas LA3 illustrated in FIG. 4B.

Referring to FIG. 4C, one type of unit emission area UA0 is located on the display area 100-DA. The unit emission area UA0 includes two second emission areas LA2 spaced apart from each other in the first direction DR1, and a first emission area LA1 and a third emission area LA3, which are spaced apart from each other in the second direction DR2. The four emission areas LA1, LA2, and LA3 of the unit emission area UA0 may be arranged in a diamond shape. The unit emission areas UA0 of the pixel rows PXR are arranged along the first direction DR1. The unit emission areas UA0 of the adjacent pixel rows PXR may be located to miss each other along the first direction DR1. The unit emission areas UA0 of the adjacent pixel columns PXC may be located to miss each other along the second direction DR2.

Figure 5:
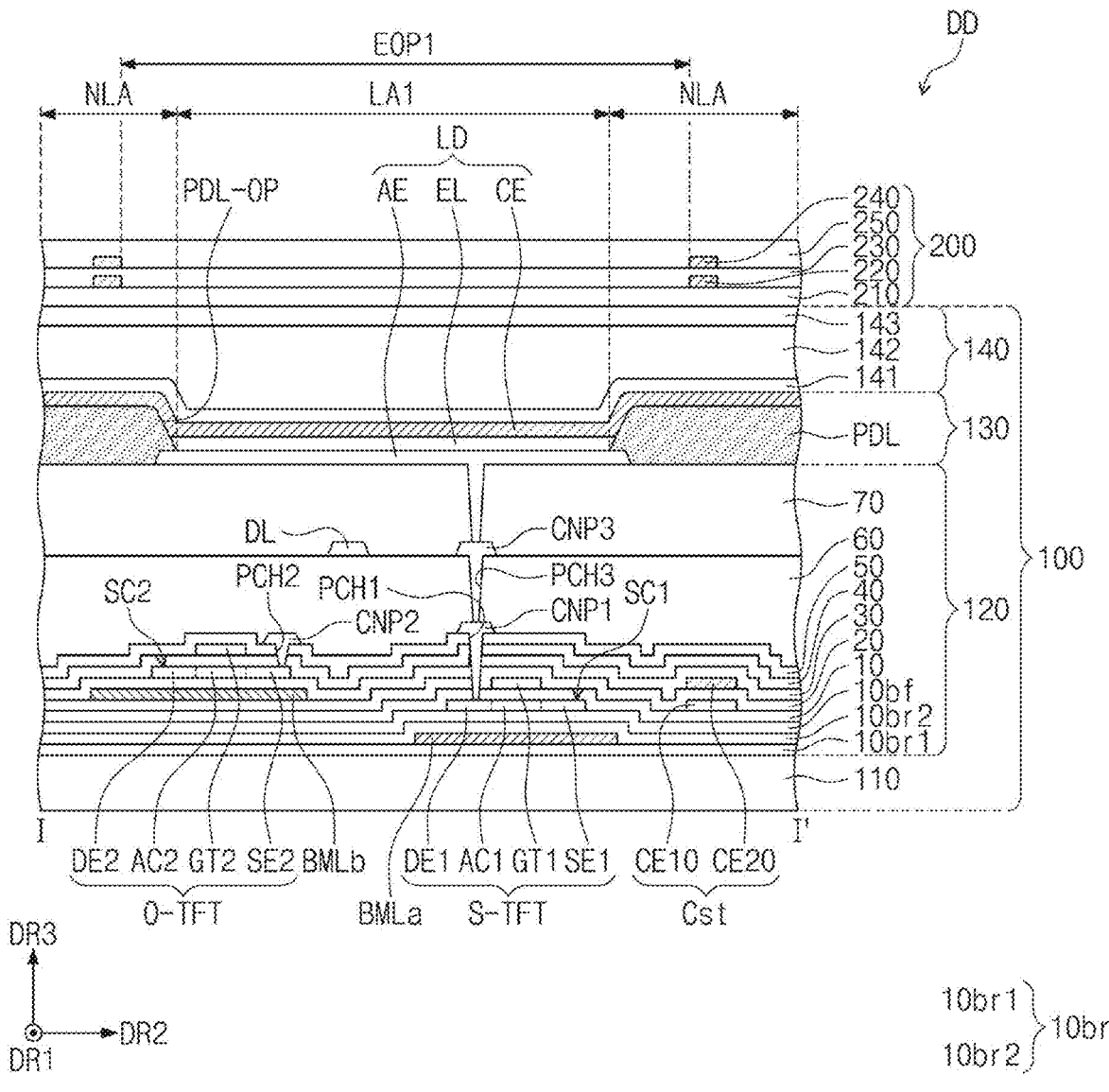
FIG. 5 is a cross-sectional view of the display device according to one or more embodiments of the present disclosure.

FIG. 5 is a cross-sectional view of the display device DD according to one or more embodiments of the present disclosure. FIG. 5 is a cross-sectional view of the display device DD, taken along the line I-I' of FIG. 4A. In FIG. 5, some components of the display device DD, such as the anti-reflective layer 300, the adhesive layer PSA, and the window WM of FIG. 2, may be omitted for clarity.

The pixel-driving circuit PC that drives the light-emitting element LD may include a plurality of pixel-driving elements. The pixel-driving circuit PC may include a plurality of transistors S-TFT and O-TFT and a capacitor Cst. In FIG. 5, a silicon transistor S-TFT and an oxide transistor O-TFT are illustrated as examples of the transistors. The pixel-driving circuit PC in FIG. 5 is only an example, and the configuration of the pixel-driving circuit PC is not necessarily limited thereto. The pixel-driving circuit PC may include only one type of transistor of the silicon transistor S-TFT or the oxide transistor O-TFT.

Referring to FIG. 5, the base layer 110 is illustrated as a single layer. The base layer 110 may include a synthetic resin, such as polyimide. The base layer 110 may be formed by applying the synthetic resin layer on a work substrate (or carrier substrate). After the follow-up process is performed to complete the display module DM (e.g., see FIG. 2), the work substrate may be removed. In one or more embodiments of the present disclosure, the base layer 110 may have a multi-layered structure including a first synthetic resin layer, at least one inorganic layer, and a second synthetic resin layer.

Referring to FIG. 5, a barrier layer 10br may be located on the base layer 110. The barrier layer 10br may reduce or prevent foreign substances introduced from the outside. The barrier layer 10br may include at least one inorganic layer. The barrier layer 10br may include a silicon oxide layer and a silicon nitride layer. Each of these may be provided in plurality, and the silicon oxide layers and silicon nitride layers may be alternately laminated.

The barrier layer 10br may include a lower barrier layer 10br1 and an upper barrier layer 10br2. A first shielding electrode BMLa may be located between the lower barrier layer 10br1 and the upper barrier layer 10br2. The first shielding electrode BMLa may be located to correspond to the silicon transistor S-TFT. The first shielding electrode BMLa may include a metal, such as molybdenum.

The first shielding electrode BMLa may receive a bias voltage. The first shielding electrode BMLa may receive a first power voltage. The first shielding electrode BMLa may block an electrical potential due to polarization from affecting the transistor S-TFT. The first shielding electrode BMLa may block external light from reaching the silicon transistor S-TFT. In one or more embodiments of the present disclosure, the first shielding electrode BMLa may be a floating electrode that is isolated from other electrodes or lines.

A buffer layer 10bf may be located on the barrier layer 10br. The buffer layer 10bf may reduce or prevent metal atoms or impurities diffused into the base layer 110 to an upper first semiconductor pattern SC1. The buffer layer 10bf may include at least one inorganic layer. The buffer layer 10bf may include a silicon oxide layer and a silicon nitride layer.

The first semiconductor pattern SC1 may be located on the buffer layer 10bf. The first semiconductor pattern SC1 may include a silicon semiconductor. For example, the silicon semiconductor may include amorphous silicon, polycrystalline silicon, and the like. For example, the first semiconductor pattern SC1 may include low-temperature polysilicon.

The first semiconductor pattern SC1 may have different electrical properties depending on whether the first semiconductor pattern SC1 is doped. The first semiconductor pattern SC1 may include a first region having high conductivity and a second region having low conductivity. The first region may be doped with an N-type dopant or a P-type dopant. The second region may be a non-doped region, or may be a region doped at a concentration that is less than that of the first region. A source region SE1, a channel region AC1 (or active region), and a drain region DE1 of the silicon transistor S-TFT may be formed from the first semiconductor pattern SC1. The source region SE1 and the drain region DE1 may respectively extend in opposite directions from the channel region AC1 in a cross-section.

A first insulating layer 10 may be located on the buffer layer 10bf. The first insulating layer 10 may cover the first semiconductor pattern SC1. The first insulating layer 10 may be an inorganic layer. The first insulating layer 10 may be a single-layered silicon oxide layer. The inorganic layer of the first insulating layer 10 as well as the driving element layer 120, which will be described later, may have a single-layered or multi-layered structure, and may include at least one of the above-described materials, but is not limited thereto.

A gate GT1 of the silicon transistor S-TFT is located on the first insulating layer 10. The gate GT1 may be a portion of a metal pattern. The gate GT1 overlaps the channel region AC1. In a process of doping the first semiconductor pattern SC1, the gate GT1 may act as a mask. A first electrode CE10 of the storage capacitor Cst is located on the first insulating layer 10. Unlike that illustrated in FIG. 5, the first electrode CE10 may have a shape that is integrated with the gate GT1.

The second insulating layer 20 may be located on the first insulating layer 10 to cover the gate GT1. In one or more embodiments of the present disclosure, an upper electrode that overlaps the gate GT1 may be further located on the second insulating layer 20. A second electrode CE20 that overlaps the first electrode CE10 may be located on the second insulating layer 20. The upper electrode overlapping the gate GT1 may have a shape that is integrated with the second electrode CE20 on the plane.

A second shielding electrode BMLb is located on the second insulating layer 20. The second shielding electrode BMLb may be located to correspond to the oxide transistor O-TFT. In one or more embodiments of the present disclosure, the second shielding electrode BMLb may be omitted. According to one or more embodiments of the present disclosure, the first shielding electrode BMLa may extend up to a lower portion of the oxide transistor O-TFT, and may replace the second shielding electrode BMLb.

The third insulating layer 30 may be located on the second insulating layer 20. The second semiconductor pattern SC2 may be located on the third insulating layer 30. The second semiconductor pattern SC2 may include a channel region AC2 of the oxide transistor O-TFT. The second semiconductor pattern SC2 may include a metal oxide semiconductor. However, the second semiconductor pattern SC2 may include transparent conductive oxide TCO, such as indium tin oxide (ITO), indium zinc oxide (IZO), indium gallium zinc oxide (IGZO), zinc oxide (ZnOx), or indium oxide (In$_2$O$_3$).

The metal oxide semiconductor may include a plurality of regions SE2, AC2, and DE2 divided depending on whether the transparent conductive oxide has been reduced. A region in which transparent conductive oxide is reduced (hereinafter, referred to as a reduction region) may have conductivity that is higher than that of a region in which the transparent conductive oxide is not reduced (hereinafter, referred to as a non-reduction region). The reduction region substantially serves as a source/drain of a transistor or a signal line. The non-reduction region substantially corresponds to a semiconductor region (or channel) of the transistor. The fourth insulating layer 40 may be located on the third insulating layer 30. As illustrated in FIG. 5, the fourth insulating layer 40 may cover the second semiconductor pattern SC2. In one or more embodiments of the present disclosure, the fourth insulating layer 40 may be an insulating pattern that overlaps the gate GT2 of the oxide transistor O-TFT.

The gate GT2 of the oxide transistor O-TFT is located on the fourth insulating layer 40. The gate GT2 of the oxide transistor O-TFT may be a portion of the metal pattern. The gate GT2 of the oxide transistor O-TFT overlaps the channel region AC2. The fifth insulating layer 50 may be located on the fourth insulating layer 40, and the fifth insulating layer 50 may cover the gate GT2. Each of the first insulating layer 10 and the fifth insulating layer 50 may be an inorganic layer.

The first connection pattern CNP1 and the second connection pattern CNP2 may be located on the fifth insulating layer 50. Because the first connection pattern CNP1 and the second connection pattern CNP2 may be formed through the same process as one another, the first connection pattern CNP1 and the second connection pattern CNP2 may have the same material and the same laminated structure. The first connection pattern CNP1 may be connected to the drain region DE1 of the silicon transistor S-TFT through a first pixel contact hole PCH1 passing through the first to fifth insulating layers 10, 20, 30, 40, and 50. The second connection pattern CNP2 may be connected to the source region SE2 of the oxide transistor O-TFT through a second pixel contact hole PCH2 passing through the fourth and fifth insulating layers 40 and 50. A connection relationship between the first connection pattern CNP1 and the second connection pattern CNP2 with respect to the silicon transistor S-TFT and the oxide transistor O-TFT is not necessarily limited thereto.

The sixth insulation layer 60 may be located on the fifth insulation layer 50. The third connection pattern CNP3 may be located on the sixth insulating layer 60. The third connection pattern CNP3 may be connected to the first connection pattern CNP1 through a third pixel contact hole PCH3 passing through the sixth insulating layer 60. A data line may be DL located on the sixth insulating layer 60. The seventh insulating layer 70 may be located on the sixth insulating layer 60, and may cover the third connection pattern CNP3 and the data line DL. Because the third connection pattern CNP3 and the data line DL may be formed through the same process as one another, the third connection pattern CNP3 and the data line DL may have the same material and the same laminated structure. Each of the sixth insulating layer 60 and the seventh insulating layer 70 may be an organic layer.

The light-emitting element LD may include an anode AE (or first electrode), an emission layer EL, and a cathode CE (or second electrode). The anode AE of the light-emitting element LD may be located on the seventh insulating layer 70. The anode AE may be a (semi) transmissive electrode or a reflective electrode. The anode AE may include a laminated structure of sequentially laminated ITO/Ag/ITO. A position of each of the anode AE and cathode CE may be changed.

A pixel-defining layer PDL may be located on the seventh insulating layer 70. For the pixel-defining layer PDL may be an organic layer. The pixel-defining layer PDL may have a property of absorbing light, and may have, for example, a black color. The pixel-defining layer PDL may include a black coloring agent. A black component may include a black dye and a black pigment. The black component may include carbon black, a metal, such as chromium, or an oxide thereof. The pixel-defining layer PDL may correspond to a light-blocking pattern having light-blocking properties.

The pixel-defining layer PDL may cover a portion of the anode AE. For example, a pixel opening PDL-OP exposing a portion of the anode AE may be defined in the pixel-defining layer PDL. The emission area LA1 may be defined to correspond to the pixel opening PDL-OP. In FIG. 5, one emission area LA1 corresponding to the first emission area LA1 of FIG. 4A is illustrated. A cross-section corresponding to the second emission area LA2 and the third emission area LA3 of FIG. 4A may also be substantially the same as that of FIG. 5. However, an emission layer EL made of a material that is different from the first emission area LA1 may be located on the second emission area LA2 and the third emission area LA3. In addition, referring to the emission area pair UP in FIG. 4A, the pixel-defining layer PDL may be located between the third emission area LA3 of the first unit emission area UA1 and the third emission area LA3 of the second unit emission area UA2. The emission layer EL located on the third emission area LA3 of the first unit emission area UA1, and on the third emission area LA3 of the second unit emission area UA2, may be located on the pixel-defining layer PDL located between the third emission area LA3 of the first unit emission area UA1 and the third emission area LA3 of the second unit emission area UA2.

In one or more embodiments of the present disclosure, a hole control layer may be located between the anode AE and the emission layer EL. The hole control layer may include a hole transport layer, and may further include a hole injection layer. An electron control layer may be located between the emission layer EL and the cathode CE. The electron control layer may include an electron transport layer, and may further include an electron injection layer.

The encapsulation layer 140 may cover the light-emitting element LD. The encapsulation layer 140 may include an inorganic encapsulation layer 141, an organic encapsulation layer 142, and an inorganic encapsulation layer 143, which are sequentially laminated, but the layers constituting the encapsulation layer 140 are not necessarily limited thereto. The inorganic encapsulation layers 141 and 143 may include a silicon nitride layer, a silicon oxy nitride layer, a silicon oxide layer, a titanium oxide layer, or an aluminum oxide layer. Each of the inorganic encapsulation layers 141 and 143 may have a multi-layered structure. The organic encapsulation layer 142 may include an acrylic-based organic layer, but is not limited thereto.

The input sensor 200 includes a plurality of conductive patterns. The input sensor 200 may include at least one conductive layer (or at least one sensor conductive layer) including a plurality of conductive patterns, and may include at least one insulating layer (or at least one sensor-insulating layer). The input sensor 200 may include a first sensor-insulating layer 210 (or first sensor-insulating layer), a first conductive layer 220 (or first sensor conductive layer), a second sensor-insulating layer 230 (or second sensor-insulating layer), a second conductive layer 240 (or second sensor conductive layer), and a third sensor-insulating layer 250 (or third sensor-insulating layer). In FIG. 5, a plurality of conductive patterns provided in each of the first conductive layer 220 and the second conductive layer 240 are briefly illustrated.

The first sensor-insulating layer 210 may be directly located on the display panel 100. The first sensor-insulating layer 210 may be an inorganic layer including at least one of silicon nitride, silicon oxynitride, or silicon oxide. Each of the first conductive layer 220 and the second conductive layer 240 may have a single-layered structure or a multi-layered structure in which a plurality of layers are laminated in the third direction DR3. The first conductive layer 220 and the second conductive layer 240 may include conductive lines defining mesh-shaped electrodes. The conductive line of the first conductive layer 220 and the conductive line of the second conductive layer 240 may or may not be connected to each other through a contact hole passing through the second sensor-insulating layer 230 according to their positions.

Each of the first conductive layer 220 and the second conductive layer 240, each of which has a single layer structure, may include a metal layer or a transparent conductive layer. The metal layer may include molybdenum, silver, titanium, copper, aluminum, or an alloy thereof. The transparent conductive layer may include transparent conductive oxide, such as indium-tin oxide (ITO), indium-zinc oxide (IZO), zinc oxide (ZnOx), or indium zinc tin oxide (IZTO). In addition, the transparent conductive layer may include conductive polymers, such as PEDOT, metal nanowires, graphene, and the like.

The first conductive layer 220 and the second conductive layer 240, each of which has a multi-layered structure, may include metal layers. The metal layers may have a three-layered structure of titanium/aluminum/titanium. The conductive layer having the multilayered structure may include at least one metal layer and at least one transparent conductive layer. The second sensor-insulating layer 230 may be located between the first conductive layer 220 and the second conductive layer 240. The second sensor-insulating layer 230 located between the first conductive layer 220 and the second conductive layer 240 may be described as a "sensing-insulating layer" in this specification. The third sensor-insulating layer 250 may cover the second conductive layer 240. In one or more embodiments of the present disclosure, the third sensor-insulating layer 250 may be omitted. Each of the second sensor-insulating layer 230 and the third sensor-insulating layer 250 may include an inorganic layer or an organic layer.

Figure 6A:
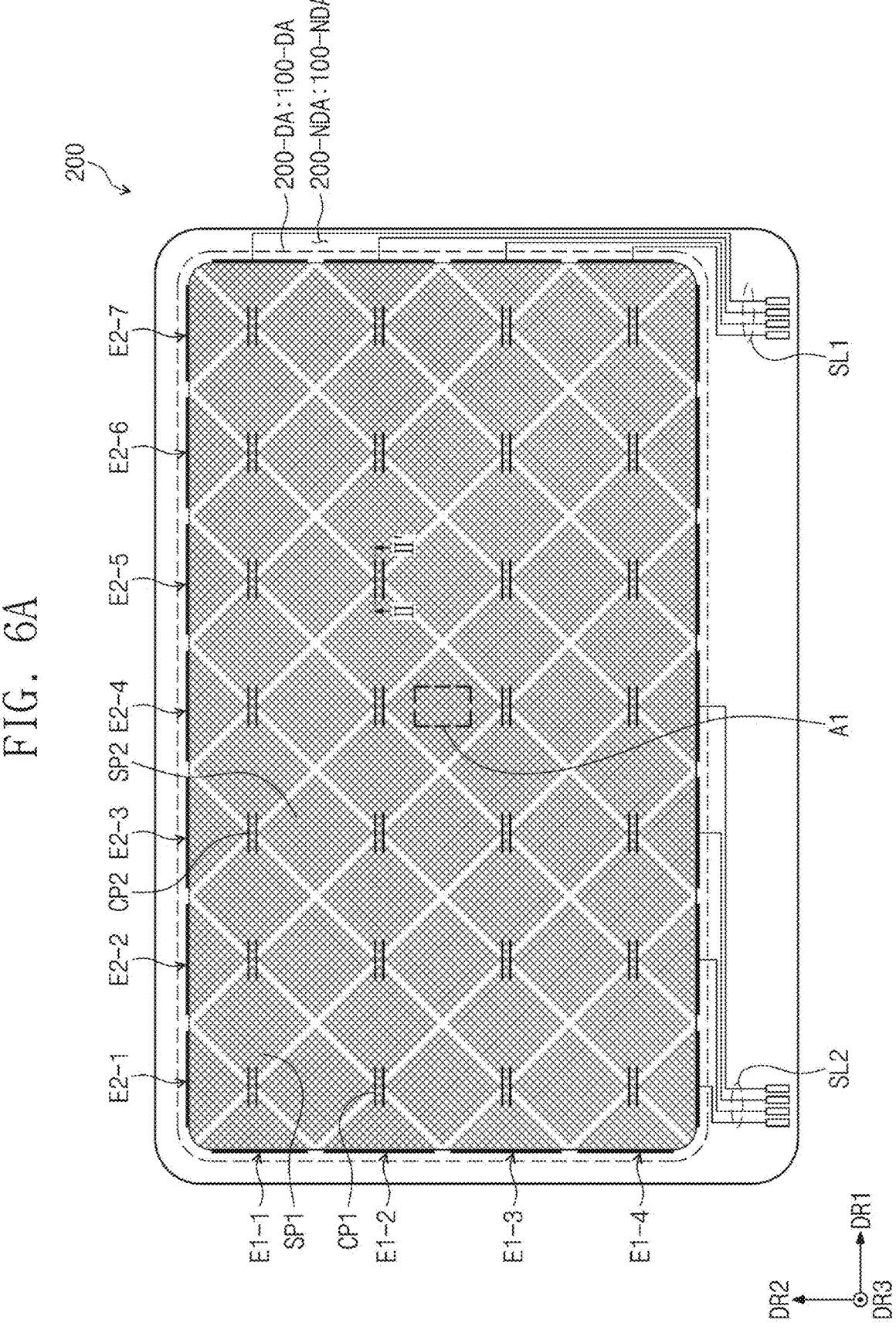
FIG. 6A is a plan view of an input sensor according to one or more embodiments of the present disclosure.
Figure 6B:
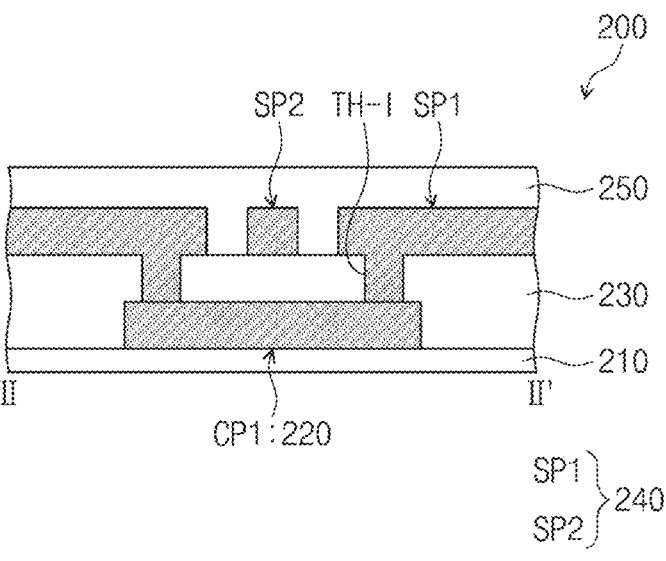
FIG. 6B is a cross-sectional view of the input sensor according to one or more embodiments of the present disclosure.

FIG. 6A is a plan view of the input sensor 200 according to one or more embodiments of the present disclosure. FIG. 6B is a cross-sectional view of the input sensor 200 according to one or more embodiments of the present disclosure. FIG. 6B is a cross-sectional view of the input sensor 200, taken along the line II-II′ of FIG. 6A.

As illustrated in FIG. 6A, the input sensor 200 includes a detection area 200-DA, and a non-detection area 200-NDA adjacent to the detection area 200-DA. The detection area 200-DA and the non-detection area 200-NDA correspond to the display area 100-DA and the non-display area 100-NDA illustrated in FIG. 5, respectively. The input sensor 200 includes first electrodes E1-1, E1-2, E1-3, and E1-4 (or first sensing electrodes), second electrodes E2-1, E2-2, E2-3, E2-4, E2-5, E2-6, and E2-7 (or second sensing electrodes), first signal lines SL1 (or first sensor signal lines), and second signal lines SL2 (or second sensor signal lines).

The first electrodes E1-1, E1-2, E1-3, and E1-4 and the second electrodes E2-1, E2-2, E2-3, E2-4, E2-5, E2-6, and E2-7, which are insulated from each other and cross each other, are located on the detection area 200-DA. The first signal lines SL1 that are electrically connected to the first electrodes E1-1, E1-2, E1-3, and E1-4, and the second signal lines SL2 that are electrically connected to the second electrodes E2-1, E2-2, E2-3, E2-4, E2-5, E2-6, and E2-7, may be located on the non-detection area 200-NDA. One of the first signal lines SL1 and the second signal lines SL2 may transmit a driving signal for detecting an external input from an external circuit to the corresponding electrodes, and the other of the first signal lines SL1 and the second signal lines SL2 may output a sensing signal. A change in capacitance between the first electrodes E1-1, E1-2, E1-3, and E1-4 and the second electrodes E2-1, E2-2, E2-3, E2-4, E2-5, E2-6, and E2-7 may be measured based on the sensing signal. A mutual-cap-type input sensor is illustrated as an example, but the present disclosure is not limited thereto. A self-cap type input sensor may also be applied. The self-cap-type input sensor may include one type of sensing electrodes.

Each of the first electrodes E1-1, E1-2, E1-3, and E1-4 and the second electrodes E2-1, E2-2, E2-3, E2-4, E2-5, E2-6, and E2-7 may have a mesh shape in which a plurality of opening areas are defined. For example, the plurality of opening areas may respectively overlap the plurality of emission areas LA1, LA2, and LA3 in FIG. 4A. The second electrodes E2-1, E2-2, E2-3, E2-4, E2-5, E2-6, and E2-7 are insulated from and cross the first electrodes E1-1, E1-2, E1-3, and E1-4. One of the first electrodes E1-1, E1-2, E1-3, and E1-4 and the second electrodes E2-1, E2-2, E2-3, E2-4, E2-5, E2-6, and E2-7 may have an integrated shape. The second electrodes E2-1, E2-2, E2-3, E2-4, E2-5, E2-6, and E2-7 having the integrated shape are illustrated as an example.

The second electrodes E2-1, E2-2, E2-3, E2-4, E2-5, E2-6, and E2-7 may include second sensing patterns SP2 and intermediate portions CP2. Each of the second sensing patterns SP2 may have a surface area that is greater than that of each of the intermediate portions CP2, and may have a diamond shape. Each of the intermediate portions CP2 is located between two adjacent second sensing patterns SP2. A length of each of the intermediate portions CP2 may be relatively short, and the intermediate portions CP2 may be omitted. Here, the sensing patterns SP2 may extend directly from the adjacent sensing patterns SP2.

Each of the first electrodes E1-1, E1-2, E1-3, and E1-4 may include first sensing patterns SP1 and bridge patterns CP1 (or connection patterns). Two adjacent first sensing patterns SP1 may be connected to the two bridge patterns CP1, but the number of bridge patterns is not limited.

Referring to FIGS. 6A and 6B, the bridge patterns CP1 may be formed from the first conductive layer 220, and the plurality of first electrodes E1-1, E1-2, E1-3, and E1-4 and the first sensing patterns SP1 may be formed from the second conductive layer 240. The bridge pattern CP1 may be connected to the first sensing patterns SP1 through a contact hole TH-I defined in the second sensor-insulating layer 230. In one or more embodiments of the present disclosure, the bridge patterns CP1 may be formed from the second conductive layer 240, and the plurality of first electrodes E1-1, E1-2, E1-3, and E1-4 and the first sensing patterns SP1 may also be formed from the first conductive layer 220.

Each of the first signal lines SL1 and the second signal lines SL2 of FIG. 6A may be formed from the first conductive layer 220 of FIG. 6B. Thus, each of the first signal lines SL1 and the second signal lines SL2 of FIG. 6A may be located on the same layer as the bridge pattern CP1 of FIG. 6B. However, the present disclosure is not limited thereto, and each of the first signal lines SL1 and the second signal lines SL2 may be formed from the second conductive layer 240. Each of the first signal lines SL1 and the second signal lines SL2 may include both a line formed from the first conductive layer 220 and a line formed from the second conductive layer 240.

Figure 7:
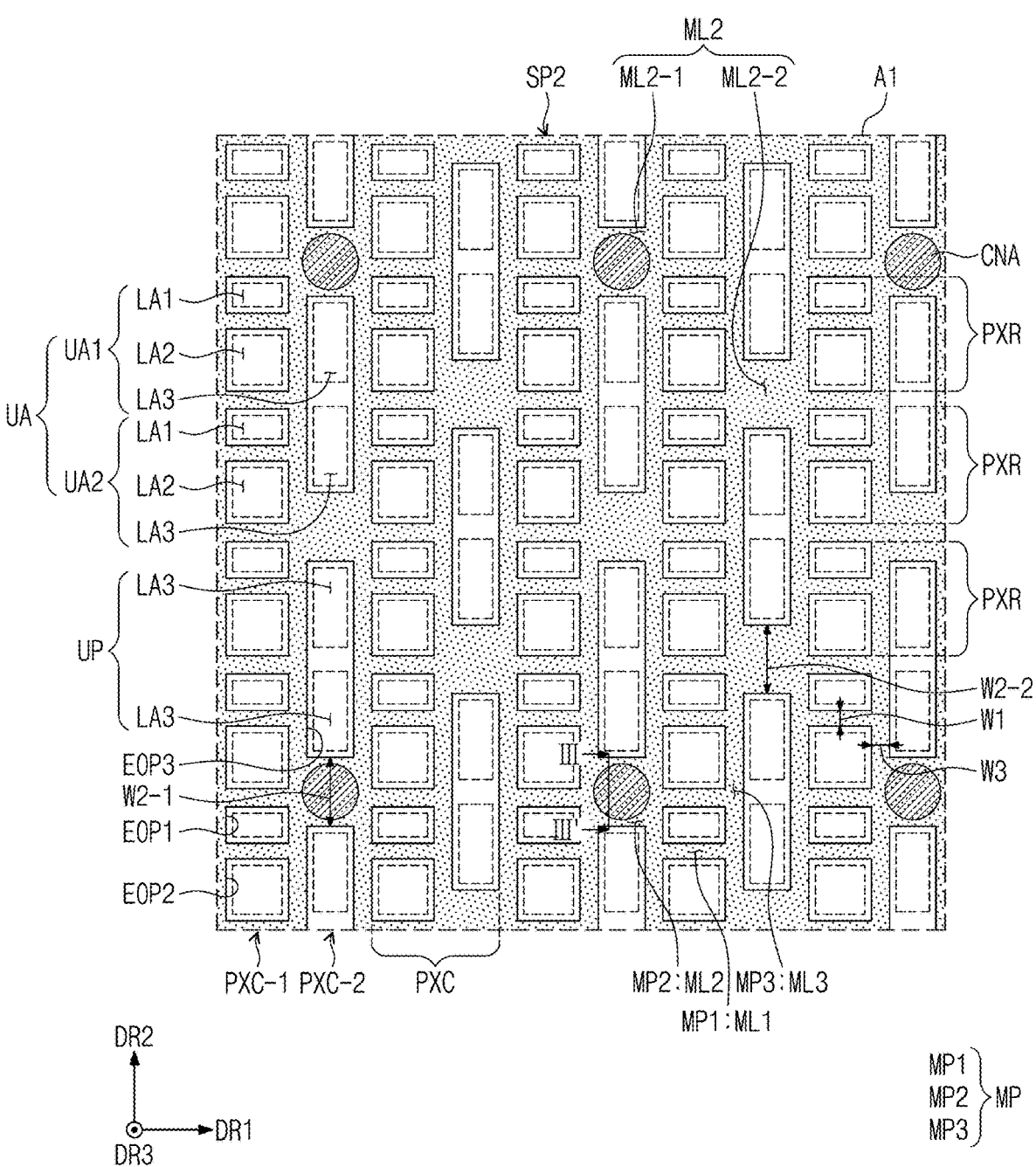
FIG. 7 is an enlarged plan view illustrating a portion of the display device according to one or more embodiments of the present disclosure.
Figure 8:
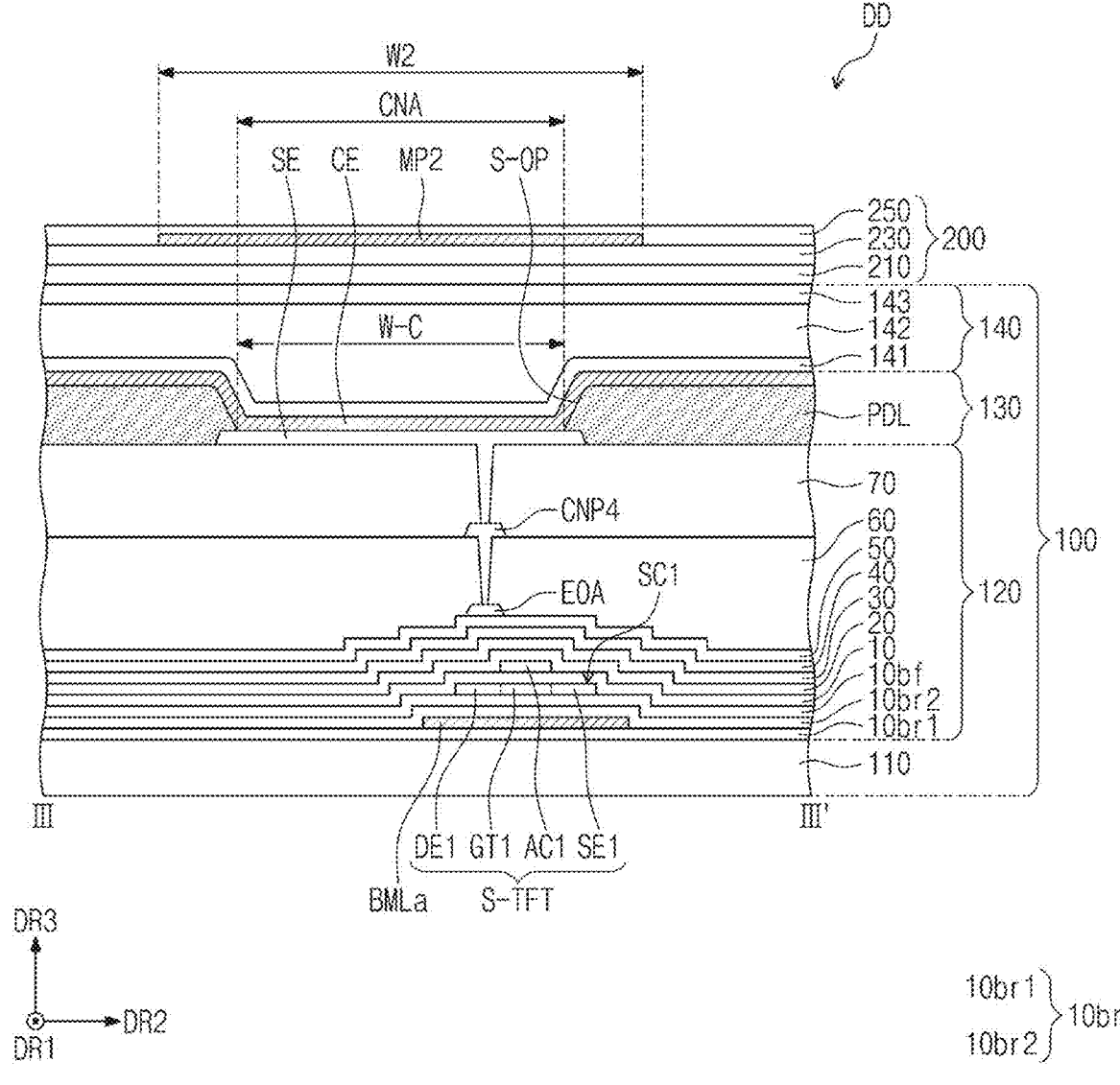
FIG. 8 is a cross-sectional view illustrating a portion of the display device according to one or more embodiments of the present disclosure.

FIG. 7 is an enlarged plan view illustrating a portion of the display device according to one or more embodiments of the present disclosure. FIG. 8 is a cross-sectional view illustrating a portion of the display device according to one or more embodiments of the present disclosure. FIG. 7 illustrates a planar arrangement relationship between a portion of the second sensing pattern SP2 provided in the input sensor, a plurality of emission areas LA1, LA2, and LA3, and a connection area CNA on an area corresponding to a first area A1 shown in FIG. 6A. FIG. 8 illustrates a cross section corresponding to a cutting line taken along the line III-III' of FIG. 7.

Referring to FIGS. 6A and 7 together, the input sensor 200 includes a plurality of conductive patterns, and the plurality of conductive patterns include first sensing electrodes SE1 and second sensing electrodes SE2. The first sensing electrodes SE1 may include first sensing patterns SP1 and bridge patterns CP1. The second sensing electrodes SE2 may include second sensing patterns SP2 and intermediate portions CP2. FIG. 7 illustrates an enlarged view illustrating one of the second sensing patterns SP2 provided in the second sensing electrodes SE2. A shape of the second sensing pattern SP2 illustrated in FIG. 7 may represent the second electrodes E2-1, E2-2, E2-3, E2-4, E2-5, E2-6, and E2-7, and the first sensing patterns SP1 may also have the same structure as the sensing patterns SP2.

A plurality of opening areas EOP1, EOP2, and EOP3 may be defined in each of the first and second sensing patterns SP1 and SP2. The plurality of opening areas EOP1, EOP2, and EOP3 may include a first opening area EOP1 corresponding to (or overlapping) the first emission area LA1, a second opening area EOP2 corresponding to the second emission area LA2, and a third opening area EOP3 corresponding to the third emission area LA3. A pixel row in which the first emission areas LA1 and the second emission areas LA2 are alternately arranged along the second direction DR2 may be referred to as a first unit pixel row PXC-1. A pixel column in which the third emission area LA3 is located along the second direction DR2 may be referred to as the second pixel column PXC-2.

The first emission area LA1 may be located inside the first opening area EOP1, the second emission area LA2 may be located inside the second opening area EOP2, and the third emission area LA3 may be located inside the third opening area EOP3. Two third emission areas LA3 may be commonly arranged along the second direction DR2 inside the third opening area EOP3. Unlike shown in FIG. 7, only one third emission area LA3 may be located inside the third opening area EOP3 in one or more embodiments.

Each of the first sensing patterns SP1 and the second sensing patterns SP2 may include a plurality of mesh patterns MP defining the plurality of opening areas EOP1, EOP2, and EOP3. The plurality of mesh patterns MP may include a first mesh pattern MP1 and a second mesh pattern MP2. Each of the first mesh pattern MP1 and the second mesh pattern MP2 may extend in the first direction DR1. The first mesh pattern MP1 may have a first width W1 in the second direction DR2, and at least a portion(s) of the second mesh pattern MP2 may have second widths W2-1 and W2-2 that are greater than the first width W1 in the second direction DR2.

The plurality of mesh patterns MP may further include a third mesh pattern MP3 extending along the second direction DR2. The third width W3 of the third mesh pattern MP3 may be less than the second width(s) W2-1 and/or W2-2 of the second mesh pattern MP2. In one or more embodiments, the third width W3 of the third mesh pattern MP3 may be substantially equal to the first width W1 of the first mesh pattern MP1. In this specification, "substantially the same" width includes not only that the widths of the two configurations are physically the same, but also the case where there is a difference due to a process error occurring during a corresponding process, despite the same design.

The first mesh pattern MP1 may be a line component parallel to the first opening area EOP1 and the second opening area EOP2 in the second direction DR2. The second mesh pattern MP2 may be a line component parallel to the third opening area EOP3 in the second direction DR2. The first mesh pattern MP1 may be located between the first emission area LA1 and the second emission area LA2 adjacent thereto. The second mesh pattern MP2 may be located between the two adjacent third emission areas LA3.

Each of the plurality of opening areas EOP1, EOP2, and EOP3 may have a planar area that is greater than a surface area of the overlapping emission area. For example, the planar area of the first opening area EOP1 may be larger than a surface area of the first emission area LA1, the planar area of the second opening area EOP2 may be larger than a surface area of the second emission area LA2, and the planar area of the third opening area EOP3 may be larger than a surface area of the third emission area LA3. As a result, the plurality of mesh patterns MP defining the plurality of opening areas EOP1, EOP2, and EOP3 may not reduce emission efficiency of light emitted through the emission areas LA1, LA2, and LA3.

The arrangement and shapes of the first to third mesh patterns MP1, MP2, and MP3 may vary depending on the arrangement and planar areas of the plurality of opening areas EOP1, EOP2, and EOP3 defined in the mesh patterns MP. In addition, the arrangement and planar areas of the plurality of opening areas EOP1, EOP2, and EOP3 may vary depending on the arrangement and surface areas of the corresponding emission areas LA1, LA2, and LA3.

For convenience of explanation, the first to third mesh patterns MP1, MP2, and MP3 are described separately, but the first to third mesh patterns MP1, MP2, MP3 may be connected to each other, and may have an integrated shape. That is, the first to third mesh patterns MP1, MP2, and MP3 may be formed by patterning the plurality of opening areas EOP1, EOP2, and EOP3 on a single conductive layer.

As illustrated in FIG. 7, each of the first to third mesh patterns MP1, MP2, and MP3 may include mesh lines. The first mesh pattern MP1 may include a first mesh line ML1 extending in the first direction DR1, the second mesh pattern MP2 may include a second mesh line ML2 extending in the first direction DR1, and the third mesh pattern MP3 may include a third mesh line ML3 extending in the second direction DR2. Each of the first mesh line ML1, the second mesh line ML2, and the third mesh line ML3 may have a width corresponding to the width of each of the mesh patterns described above. The first mesh line ML1 may have a first width W1 in the second direction DR2, and the second mesh line ML2 may have second widths W2-1 and W2-2 that are greater than the first width W1 in the second direction DR2. The third width W3 of the third mesh line ML3 may be less than the second widths W2-1 and W2-2 of the second mesh line ML2. In one or more embodiments, the third width W3 of the third mesh line ML3 may be substantially equal to the first width W1 of the first mesh line ML1.

Referring to FIGS. 7 and 8 together, at least a portion of the second mesh pattern MP2 overlaps the connection area CNA. The second mesh pattern MP2 may be located on the above-described second sensor-insulating layer 230. The second mesh pattern MP2 may be covered by the third sensor-insulating layer 250. That is, the second mesh pattern MP2 may correspond to the above-described second conductive layer 240 (see FIG. 5).

The connection area CNA is defined as an area on which the auxiliary electrode SE and the cathode CE are electrically connected. The auxiliary electrode SE may be located on the driving element layer 120. The auxiliary electrode SE may include the same material as the anode AE (see FIG. 5) described above, and may be formed on the driving element layer 120 through the same process. The connection area CNA may be a portion at which organic layers, such as the emission layer EL provided in the light-emitting element are removed through a laser drilling process so that the cathode CE is connected to the auxiliary electrode SE. That is, the emission layer EL may not overlap the connection area CNA. In one or more embodiments, when the light-emitting element LD (see FIG. 5) further includes a hole control layer and an electronic control layer, the connection area CNA may be a portion at which the emission layer EL, a hole control layer, and an electronic control layer are removed by the laser drilling so that the cathode CE is connected to the auxiliary electrode SE.

The auxiliary electrode SE may be a conductive pattern to which a power supply voltage is applied. The auxiliary electrode SE may be connected to a fourth connection pattern CNP4 through a contact hole passing through the seventh insulating layer 70, and the fourth connection pattern CNP4 may be connected to a power line EOA through a contact hole passing through the sixth insulating layer 60. The auxiliary electrode SE may be electrically connected to the power line EOA to receive a power supply voltage. For example, the auxiliary electrode SE may receive the above-described second power voltage. The display device according to one or more embodiments may include the connection area CNA on which the auxiliary electrode SE, to which the second power supply voltage is applied, is connected to the cathode CE, to reduce or prevent voltage drop of the second power voltage applied to the cathode CE.

The connection area CNA on which the auxiliary electrode SE is located may not overlap each of the first emission area LA1, the second emission area LA2, and the third emission area LA3. The auxiliary electrode SE located on the connection area CNA may be spaced apart from the anode AE (see FIG. 5), which is located on each of the first emission area LA1, the second emission area LA2, and the third emission area LA3, on the plane/in plan view. A connection opening S-OP exposing a top surface of the auxiliary electrode SE may be defined in the pixel-defining layer PDL, and the connection opening S-OP may be spaced apart from the above-described pixel opening PDL-OP (see FIG. 5) on the plane.

The connection area CNA may overlap a portion of the third emission area LA3 in the second direction DR2. That is, the connection area CNA may be located in the above-described second pixel column PXC-2.

At least a portion of the second mesh pattern MP2 overlaps the connection area CNA on the plane. In one or more embodiments, at least a portion of the second mesh line ML2 may overlap the connection area CNA on the plane. At least a portion of the second mesh pattern MP2 overlapping the connection area CNA may have a surface area that is greater than that of the connection area CNA to entirely cover the connection area CNA. The connection area CNA may have a reference width W-C in the second direction DR2, and at least a portion of the second mesh pattern MP2 may have a second width W2 that is greater than the reference width W-C in the second direction DR2. The reference width W-C may be about 100 micrometers or less. The reference width W-C may be, for example, about 1 micrometer or more and about 100 micrometers or less.

In the display device DD according to one or more embodiments, the display panel 100 may be connected to the cathode CE and the auxiliary electrode SE through the laser drilling process, and may have a structure in which a conductive pattern having a relatively large width overlaps an upper portion of the connection area CNA corresponding to an exposed top surface of the auxiliary electrode SE to improve visibility of the display device DD.

In more detail, in the display device DD according to one or more embodiments, the second mesh of the input sensor 200 located on the upper portion of the connection area CNA may have a width that is greater than that of each of other mesh patterns with respect to the connection area CNA, through which the top surface of the auxiliary electrode SE is exposed, and thus, the upper portion of the connection area CNA may be entirely covered. Thus, defects, such as reflection of external light on the upper portion of the auxiliary electrode SE made of a highly reflective metal, may be reduced or prevented, and visibility of the auxiliary electrode SE from the outside may be reduced or prevented. Thus, the visibility of the display device DD may be improved.

Referring again to FIG. 7, the second mesh line ML2 provided in the second mesh pattern MP2 may include a 2-1 mesh line ML2-1 and a 2-2 mesh line ML2-2. Each of the 2-1 mesh line ML2-1 and the 2-2 mesh line ML2-2 may be located between the two adjacent emission area pairs UP. The 2-1 mesh line ML2-1 may overlap the connection area CNA, and the 2-2 mesh line ML2-2 may not overlap the connection area CNA.

The 2-1 mesh line ML2-1 may have a 2-1 width W2-1, and the 2-2 mesh line ML2-2 may have a 2-2 width W2-2. As illustrated in FIG. 7, each of the 2-1 width W2-1 and the 2-2 width W2-2 may be substantially the same. That is, in one or more embodiments, the second mesh line ML2 may have substantially the same width on each of the 2-1 mesh line ML2-1, which is a portion overlapping the connection area CAN, and the 2-2 mesh line ML2-2, which does not overlap the connection area CNA.

Figure 9:
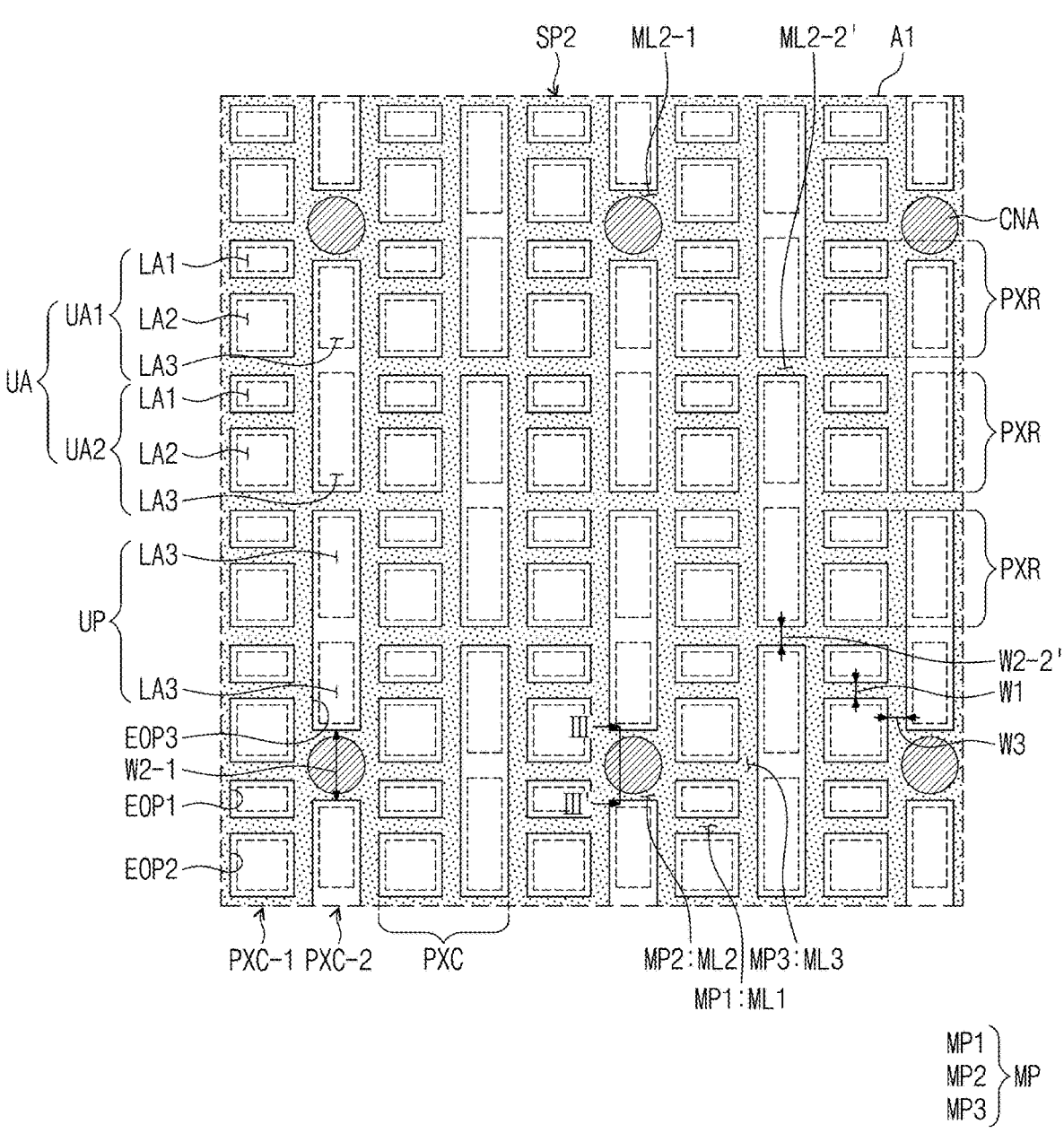
FIG. 9 is an enlarged plan view illustrating a portion of the display device according to one or more embodiments of the present disclosure.

FIG. 9 is an enlarged plan view illustrating a portion of the display device according to one or more embodiments of the present disclosure. FIG. 9 illustrates a shape of a sensing pattern according to one or more embodiments, which is different from that of the second sensing pattern SP2 in FIG. 7.

Referring to FIG. 9, unlike that illustrated in FIG. 7, the second mesh line ML2 provided in the second mesh pattern MP2 may include a 2-1 mesh line ML2-1 and a 2-2 mesh line ML2-2'. Each of the 2-1 mesh line ML2-1 and the 2-2 mesh line ML2-2' may be located between the two adjacent emission area pairs UP. The 2-1 mesh line ML2-1 may overlap the connection area CNA, and the 2-2 mesh line ML2-2' may not overlap the connection area CNA.

The 2-1 mesh line ML2-1 may have a 2-1 width W2-1, and the 2-2 mesh line ML2-2' may have a 2-2 width W2-2'. As illustrated in FIG. 9, the 2-1 width W2-1 may be greater than the 2-2 width W2-2'. The 2-1 width W2-1 may be greater than each of the first width W1 and the third width W3. The 2-1 width W2-1 may be greater than the reference width W-C (see FIG. 8) of the connection area CNA described above. The 2-2 width W2-2' may be less than the 2-1 width W2-1, and may be substantially equal to each of the first width W1 and the third width W3. In the display device according to one or more embodiments, the 2-1 width W2-1 of the 2-1 mesh line ML2-1 overlapping the connection area CNA may be formed to be large, and the 2-2 width W2-2' of the 2-2 mesh line ML2-2 that does not overlap the connection area CNA, may be formed to be as small as each of the first width W1 and the third width W3, and thus, the width of the third opening area EOP3 in which the third emission area LA3 is located may be formed to be larger. Thus, resolution of the display device may be improved.

Figure 10A:
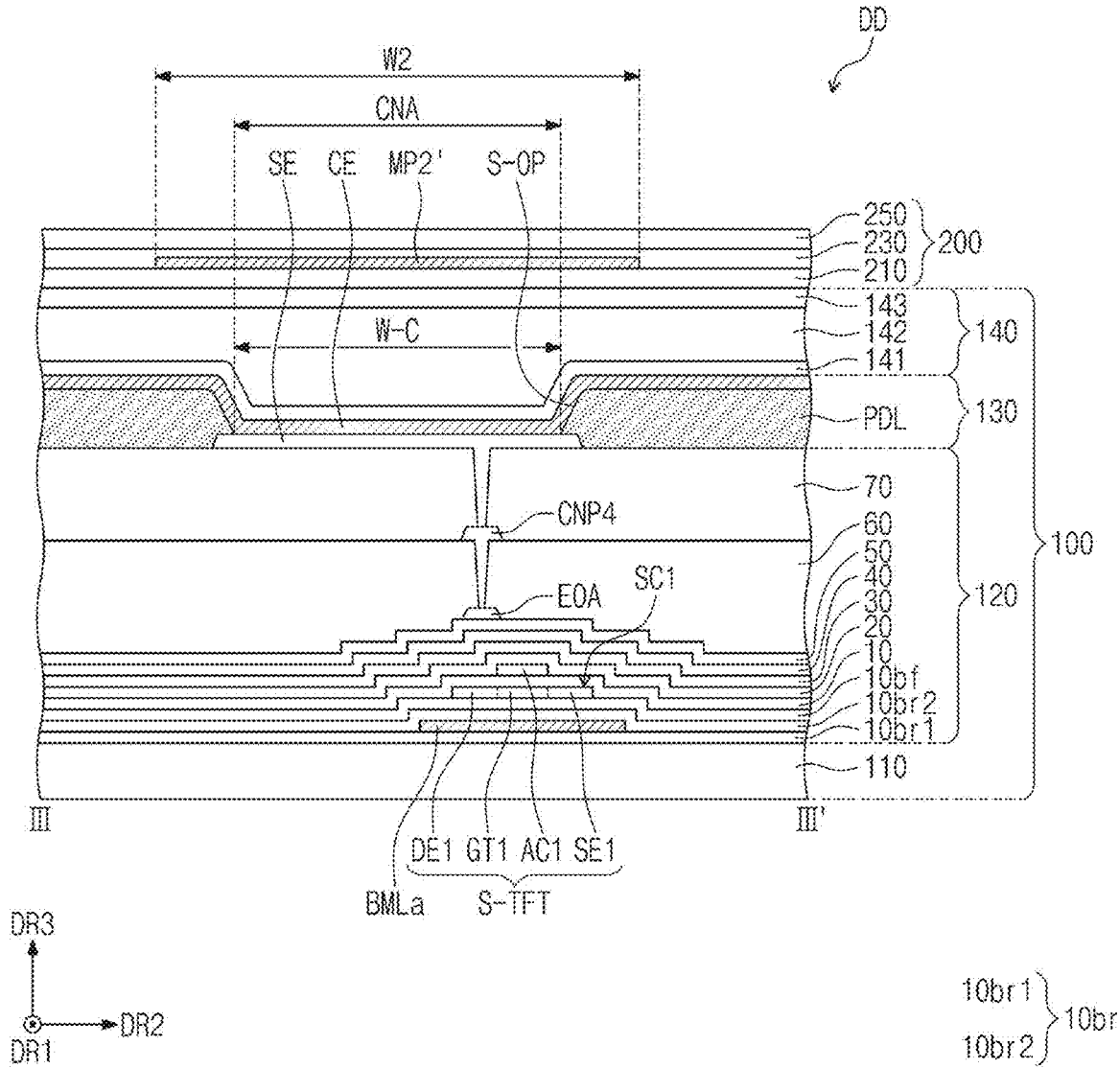
FIGS. 10A and 10B are cross-sectional views illustrating a portion of the display device according to one or more embodiments of the present disclosure.
Figure 10B:
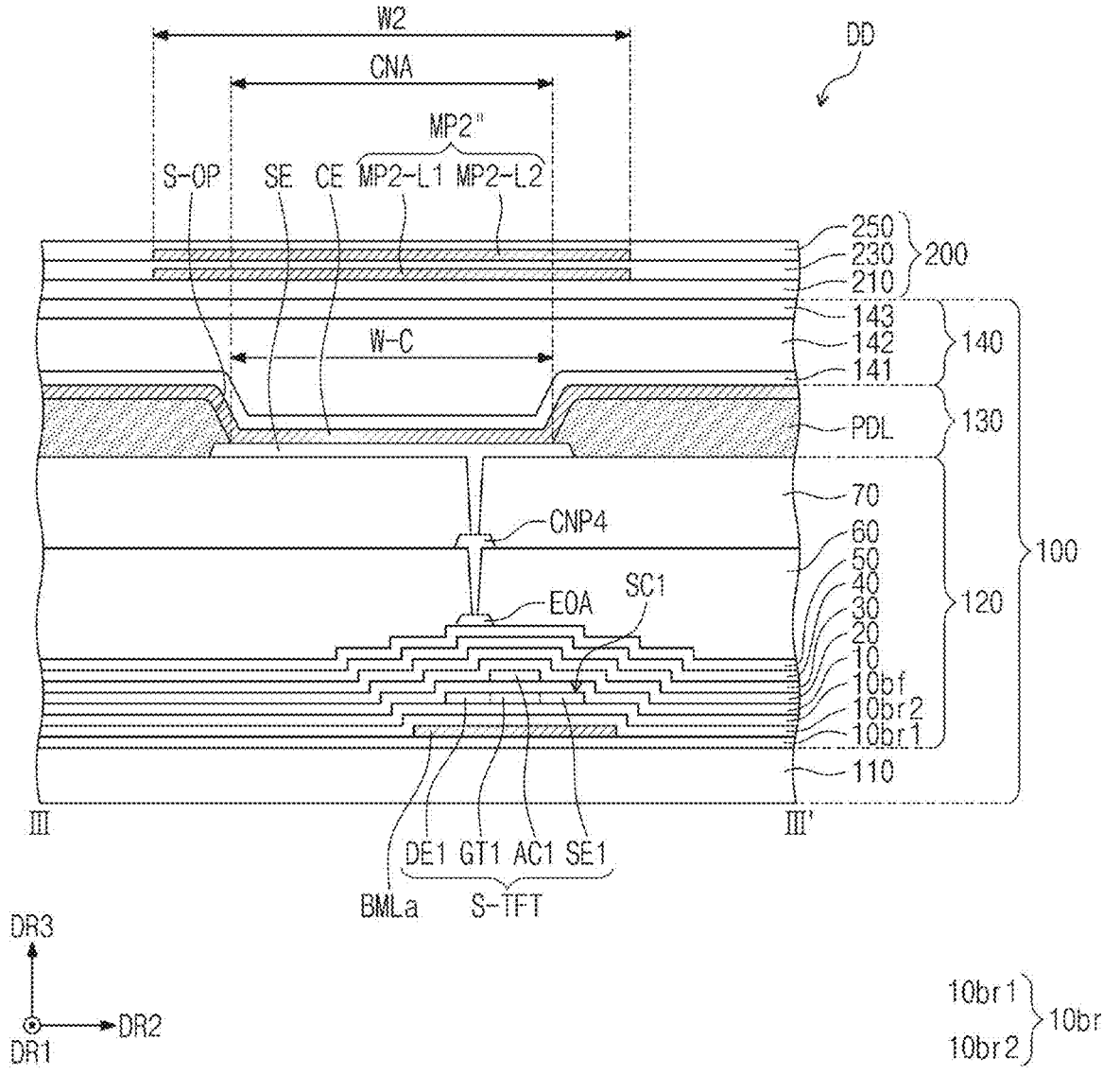

FIGS. 10A and 10B are cross-sectional views illustrating a portion of the display device according to one or more embodiments of the present disclosure. Each of FIGS. 10A and 10B illustrates a mesh pattern shape according to one or more embodiments, which is different from the second mesh pattern MP2 according to the foregoing one or more embodiments corresponding to FIG. 8.

Referring to FIG. 10A, unlike shown in FIG. 8, the second mesh pattern MP2' may be located on the above-described first sensor-insulating layer 210. The second mesh pattern MP2' may be covered by the second sensor-insulating layer 230. That is, the second mesh pattern MP2' may correspond to the above-described first conductive layer 220 (see FIG. 5).

At least a portion of the second mesh pattern MP2' located on the first sensor-insulating layer 210 overlaps the connection area CNA on the plane. At least a portion of the second mesh pattern MP2' overlapping the connection area CNA may have a surface area that is greater than that of the connection area CNA to entirely cover the connection area CNA. The connection area CNA may have a reference width W-C in the second direction DR2, and at least a portion of the second mesh pattern MP2' may have a second width W2 that is greater than the reference width W-C in the second direction DR2.

Referring to FIG. 10B, unlike shown in FIG. 8, a second mesh pattern MP2" may have a multi-layered structure. The second mesh pattern MP2" may include a first layer pattern MP2-L1 and a second layer pattern MP2-L2.

The first layer pattern MP2-L1 may be located on the above-described first sensor-insulating layer 210. The first layer pattern MP2-L1 may be covered by the second sensor-insulating layer 230. That is, the first layer pattern MP2-L1 may correspond to the above-described first conductive layer 220 (see FIG. 5). The second layer pattern MP2-L2 may be located on the above-described second sensor-insulating layer 230. The second layer pattern MP2-L2 may be covered by the third sensor-insulating layer 250. That is, the second layer pattern MP2-L2 may correspond to the above-described second conductive layer 240 (see FIG. 5).

At least a portion of the second mesh pattern MP2" overlaps the connection area CNA on the plane/in plan view. At least a portion of each of the first layer pattern MP2-L1 and the second layer pattern MP2-L2 may overlap the connection area CNA on the plane. At least a portion of the first layer pattern MP2-L1 and the second layer pattern MP2-L2 overlapping the connection area CNA may have a surface area that is greater than that of the connection area CNA to entirely cover the connection area CNA. The connection area CNA may have a reference width W-C in the second direction DR2, and at least a portion of the first layer pattern MP2-L1 and the second layer pattern MP2-L2 may have a second width W2 that is greater than the reference width W-C in the second direction DR2. In FIG. 10B, the first layer pattern MP2-L1 and the second layer pattern MP2-L2 are illustrated to have the same second width W2 as an example, but are not limited thereto, and the first layer pattern MP2-L1 and the second layer pattern MP2-L2 may have widths that are different from each other. For example, the first layer pattern MP2-L1 may have a 2-1 width, and the second layer pattern MP2-L2 may have a width that is less than the 2-2 width.

Figure 11A:
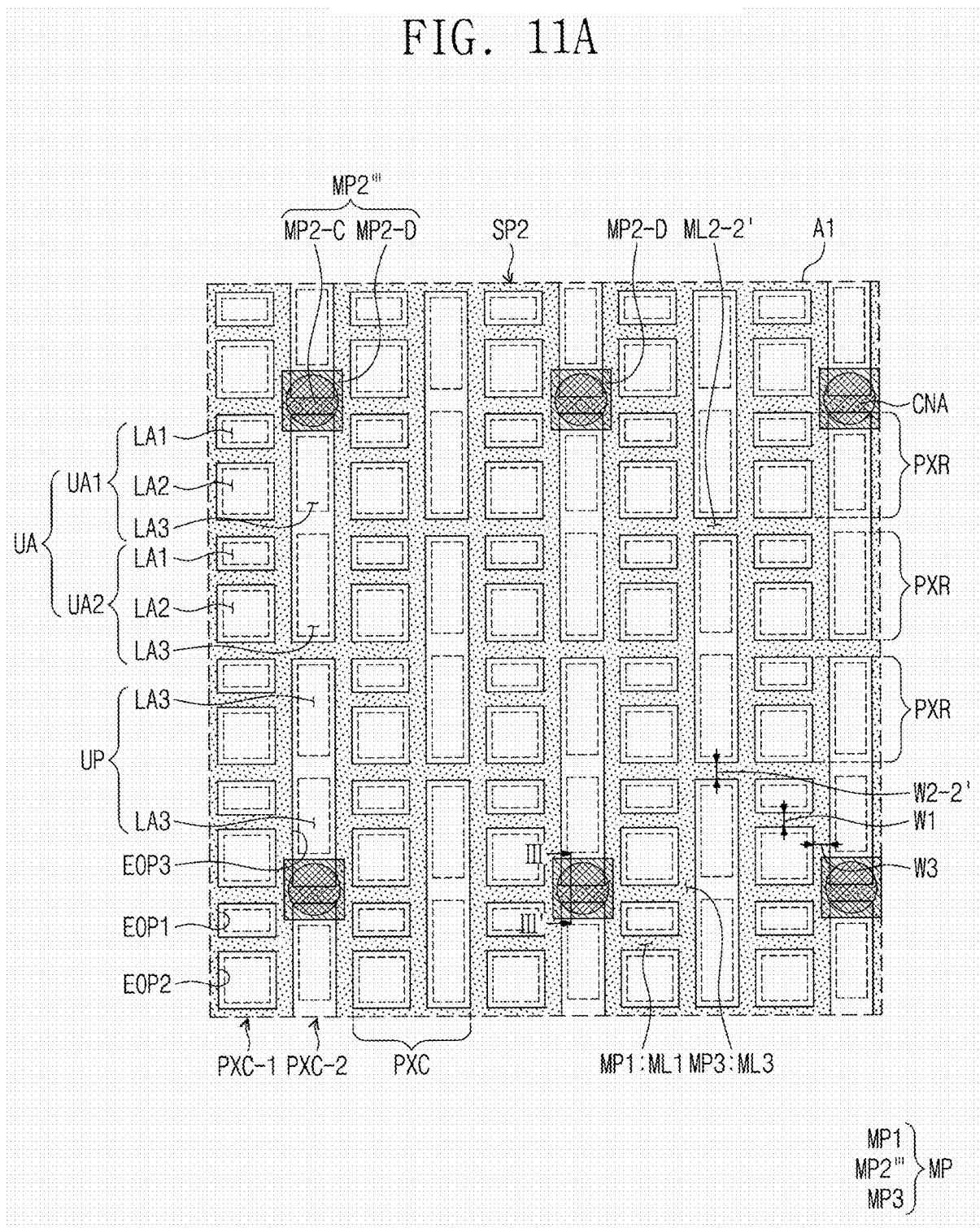
FIG. 11A is an enlarged plan view illustrating a portion of the display device according to one or more embodiments of the present disclosure.
Figure 11B:
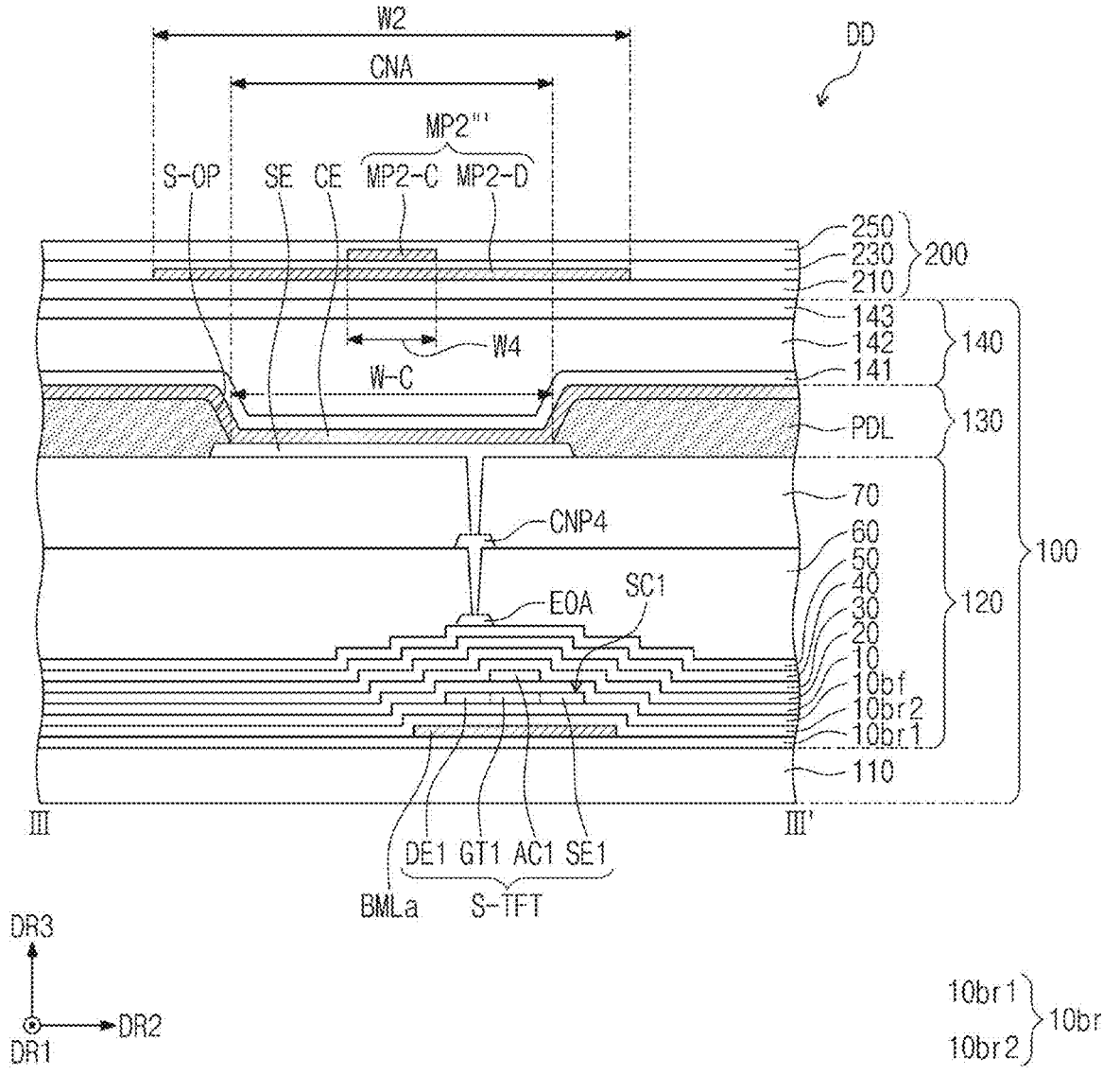
FIG. 11B is a cross-sectional view illustrating a portion of the display device according to one or more embodiments of the present disclosure.

FIG. 11A is an enlarged plan view illustrating a portion of the display device according to one or more embodiments of the present disclosure. FIG. 11B is a cross-sectional view illustrating a portion of the display device according to one or more embodiments of the present disclosure. FIGS. 11A and 11B illustrate shapes of the sensing pattern and the mesh pattern according to one or more embodiments, which are different from that according to the foregoing one or more embodiments corresponding to FIGS. 7 and 8.

Referring to FIGS. 11A and 11B, in one or more embodiments, a portion of the second mesh pattern MP2''' that overlaps the connection area CNA may include a line portion MP2-C and a dummy portion MP2-D. The line portion MP2-C may have a shape that is integrated with other mesh lines. In one or more embodiments, the line portion MP2-C may have a shape that is integrated with the third mesh line ML3 and the first mesh line ML1. The dummy portion MP2-D may not be connected to the line portion MP2-C, but may be separated with an insulating layer therebetween. The dummy portion MP2-D may be a floating electrode that is isolated from other electrodes or lines. A separate voltage and current may not be applied to the dummy portion MP2-D.

The line portion MP2-C and the dummy portion MP2-D may be located on different layers. In one or more embodiments, the dummy portion MP2-D may be located on the above-described first sensor-insulating layer 210. The dummy portion MP2-D may be covered by the second sensor-insulating layer 230. That is, the dummy portion MP2-D may correspond to the above-described first conductive layer 220 (see FIG. 5). The dummy portion MP2-D may correspond to the above-described first layer pattern MP2-L1 (see FIG. 10B). The line portion MP2-C may be located on the above-described second sensor-insulating layer 230. The line portion MP2-C may be covered by the third sensor-insulating layer 250. That is, the line portion MP2-C may correspond to the above-described second conductive layer 240 (see FIG. 5). The line portion MP2-C may correspond to the above-described second layer pattern MP2-L2 (see FIG. 10B).

At least a portion of the second mesh pattern MP2''' overlaps the connection area CNA on the plane. At least a portion of each of the line portion MP2-C and the dummy portion MP2-D may overlap the connection area CNA on the plane/in plan view.

The dummy portion MP2-D overlapping the connection area CNA may have a surface area that is greater than that of the connection area CNA to entirely cover the connection area CNA. The connection area CNA may have a reference width W-C in the second direction DR2, and the dummy portion MP2-D may have a second width W2 that is greater than the reference width W-C in the second direction DR2.

The line portion MP2-C may have a width that is different from that of the dummy portion MP2-D. The line portion MP2-C may have a fourth width W4, and the fourth width W4 may be less than the second width W2. The fourth width W4 may be less than the reference width W-C of the connection area CNA. The fourth width W4 may be substantially equal to each of the first width W1 of the first mesh line ML1 and the third width W3 of the third mesh line ML3. The fourth width W4 may be substantially equal to the 2-2 width W2-2' of the 2-2 mesh line ML2-2'.

According to one or more embodiments of the present disclosure, the external visibility of the auxiliary electrode, which reduces or prevents the voltage drop of the cathode, may be reduced or prevented to improve the visibility of the display device.

It will be apparent to those skilled in the art that various modifications and variations can be made to the disclosed embodiments. Thus, it is intended that the present disclosure covers the modifications and variations of the disclosed embodiments, provided they come within the scope of the appended claims and their equivalents. Therefore, the present disclosure is not limited to the contents described in the detailed description of the specification, but should be determined by the claims, with functional equivalents thereof to be included therein.

What is claimed is:

1. A display device comprising:
a display panel comprising emission areas; and
an input sensor above the display panel, and comprising conductive patterns,
wherein the display panel comprises:
a light-emitting element overlapping at least one of the emission areas, and comprising an anode, an emission layer above the anode, and a cathode above the emission layer; and
an auxiliary electrode spaced apart from the anode in plan view, and electrically connected to the cathode at a connection area,
wherein the conductive patterns comprise mesh patterns defining openings respectively overlapping the emission areas, the mesh patterns comprising:
a first mesh pattern having a first width; and
a second mesh pattern comprising a portion having a second width that is greater than the first width, and comprising a portion entirely covering the connection area.

2. The display device of claim 1, wherein the first mesh pattern comprises a first mesh line extending in a first direction, and
wherein the second mesh pattern comprises a second mesh line extending in the first direction.

3. The display device of claim 2, wherein each of the mesh patterns further comprises a third mesh line extending in a second direction crossing the first direction, and having a third width that is less than the second width.

4. The display device of claim 3, wherein the emission areas comprise:

first emission areas configured to emit first color light;
second emission areas configured to emit second color light different from the first color light, and alternately arranged with the first emission areas along the second direction; and
third emission areas configured to emit third color light different from the first color light and the second color light, and spaced apart from the first emission areas and the second emission areas in the first direction.

5. The display device of claim 4, wherein the connection area overlaps at least a portion of the third emission areas in the second direction.

6. The display device of claim 4, wherein the first mesh pattern is between one of the first emission areas and one of the second emission areas adjacent thereto,
wherein adjacent pairs of the third emission areas define emission area pairs spaced from each other by a first distance in the second direction, and
wherein two adjacent ones of the emission area pairs are spaced from each other a second distance in the second direction that is greater than the first distance with the second mesh pattern therebetween.

7. The display device of claim 6, wherein the second mesh pattern comprises:
a 2-1 mesh line between the two adjacent emission area pairs, overlapping the connection area, and having a 2-1 width; and
a 2-2 mesh line between two other adjacent emission area pairs, not overlapping the connection area, and having a 2-2 width that is less than the 2-1 width.

8. The display device of claim 6, wherein the second mesh pattern comprises:
a 2-1 mesh line between the two adjacent emission area pairs, overlapping the connection area, and having a 2-1 width; and
a 2-2 mesh line between two other adjacent emission area pairs, not overlapping the connection area, and having a 2-2 width that is substantially equal to the 2-1 width.

9. The display device of claim 1, wherein the input sensor comprises:
a first sensor-insulating layer above the display panel; and
a second sensor-insulating layer above the first sensor-insulating layer.

10. The display device of claim 9, wherein the second mesh pattern is above the second sensor-insulating layer.

11. The display device of claim 9, wherein the second mesh pattern is above the first sensor-insulating layer.

12. The display device of claim 9, wherein the second mesh pattern comprises:
a first layer pattern above the first sensor-insulating layer; and
a second layer pattern above the second sensor-insulating layer.

13. The display device of claim 12, wherein the first layer pattern has the second width, and
wherein the second layer pattern has a width that is less than the second width.

14. The display device of claim 1, wherein the display panel further comprises a pixel-defining layer defining pixel openings respectively defining the emission areas, and a connection opening defining the connection area,
wherein at least a portion of the emission layer is inside one of the pixel openings, and
wherein the cathode is inside the connection opening to contact the auxiliary electrode.

15. The display device of claim 1, wherein the emission layer does not overlap the connection area.

16. The display device of claim 1, wherein the connection area has a width of about 1 micrometers or more and about 100 micrometers or less.

17. A display device comprising:

a display panel comprising emission areas; and an input sensor above the display panel, and comprising conductive patterns, wherein the display panel comprises:

a light-emitting element overlapping at least one of the emission areas, and comprising an anode, an emission layer above the anode, and a cathode above the emission layer; and an auxiliary electrode spaced apart from the anode in plan view, and electrically connected to the cathode at a connection area, wherein the conductive patterns comprise:

a first sensing electrode comprising first sensing patterns arranged in a first direction, and bridge patterns configured to connect adjacent ones of the first sensing patterns; and a second sensing electrode spaced apart from the first sensing electrode, and comprising second sensing patterns extending in a second direction crossing the first direction, wherein each of the first sensing electrode and the second sensing electrode comprises mesh patterns defining openings respectively overlapping the emission areas, and comprising a portion entirely covering the connection area.

18. The display device of claim 17, wherein the input sensor further comprises:

a first sensor-insulating layer above the display panel; and a second sensor-insulating layer above the first sensor-insulating layer, wherein the first sensing patterns and the second sensing patterns are above the second sensor-insulating layer.

19. The display device of claim 17, wherein the connection area has a reference width in the second direction, and wherein a portion of the mesh patterns has a second width that is greater than the reference width.

20. A display device comprising:

a display panel comprising first emission areas configured to emit first color light, second emission areas configured to emit second color light that is different from the first color light, and third emission areas configured to emit third color light that is different from the first color light and the second color light; and an input sensor above the display panel, and comprising conductive patterns, wherein the display panel comprises:

a light-emitting element comprising an anode, an emission layer above the anode, and a cathode above the emission layer; and an auxiliary electrode spaced apart from the anode in plan view, above a portion of the third emission areas, and electrically connected to the cathode at a connection area, wherein the conductive patterns comprise mesh patterns defining openings respectively overlapping the first, second, and third emission areas are defined, and comprising a portion entirely covering the connection area.

* * * * *